US012164710B2

(12) United States Patent
Yoo

(10) Patent No.: US 12,164,710 B2
(45) Date of Patent: Dec. 10, 2024

(54) WEARABLE DEVICE AND METHOD FOR CONTROLLING SAME

(71) Applicant: SAMSUNG ELECTRONICS CO., LTD., Suwon-si (KR)

(72) Inventor: Byeongwook Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/540,371

(22) Filed: Dec. 14, 2023

(65) Prior Publication Data
US 2024/0126382 A1 Apr. 18, 2024

Related U.S. Application Data

(63) Continuation of application No. PCT/KR2022/008403, filed on Jun. 14, 2022.

(30) Foreign Application Priority Data

Jun. 15, 2021 (KR) .................. 10-2021-0077422

(51) Int. Cl.
G06F 3/038 (2013.01)
G06F 3/041 (2006.01)
(Continued)

(52) U.S. Cl.
CPC .............. *G06F 3/038* (2013.01); *G06F 3/041* (2013.01); *G06V 40/13* (2022.01);
(Continued)

(58) Field of Classification Search
CPC .. G06F 3/038; G06F 3/041; G06F 2203/0331; G06F 2203/0384; G06F 1/163;
(Continued)

(56) References Cited

U.S. PATENT DOCUMENTS 7,569,762 B2 * 8/2009 Baum, Jr. .............. G10H 1/348
84/626
8,754,849 B2 * 6/2014 Hamada .................. G06F 3/014
345/157

(Continued)

FOREIGN PATENT DOCUMENTS

JP 2004-199145 A 7/2004
JP 2016-24718 A 2/2016

(Continued)

OTHER PUBLICATIONS

International Search Report and Written Opinion dated Sep. 26, 2022, issued by the International Searching Authority in International Application No. PCT/KR2022/008403 (PCT/ISA/220, PCT/ISA/210, and PCT/ISA/237).

Primary Examiner — Bryan Earles
(74) Attorney, Agent, or Firm — Sughrue Mion, PLLC

(57) ABSTRACT

A method of controlling a wearable device worn on a finger of a user, includes: sensing a contact by a second finger of the user via an outer surface electrode located on an outer circumferential surface of the wearable device worn on a first finger of the user; based on the sensing of the contact, measuring an impedance between the outer surface electrode and an inner surface electrode that is in contact with the first finger of the user; identifying a type of the second finger based on the impedance; and controlling an operation of the wearable device based on the type of the second finger.

20 Claims, 15 Drawing Sheets

TYPE 1

⇩

TYPE 2

⇩

(51) Int. Cl.
  *G06V 40/12* (2022.01)
  *G06V 40/13* (2022.01)
(52) U.S. Cl.
  CPC .. *G06V 40/1365* (2022.01); *G06F 2203/0331* (2013.01); *G06F 2203/0384* (2013.01)
(58) Field of Classification Search
  CPC ...... G06F 3/011; G06F 3/014; G06F 3/03547; G06F 1/16; G06F 3/016; G06F 3/04166; G06V 40/13; G06V 40/1365; G06V 40/12
  See application file for complete search history.

(56) References Cited

U.S. PATENT DOCUMENTS

| | | | | |
|---|---|---|---|---|
| 9,496,923 | B2* | 11/2016 | Han | G06F 3/04162 |
| 9,665,763 | B2* | 5/2017 | Du | G06V 40/13 |
| 10,359,846 | B2 | 7/2019 | Priyantha et al. | |
| 10,386,185 | B2* | 8/2019 | Wan | A61B 5/11 |
| 12,045,393 | B2* | 7/2024 | Saenz Lobsack | G06F 3/017 |
| 2008/0072691 | A1* | 3/2008 | Gruber | G06F 3/017 |
| | | | | 324/692 |
| 2010/0219989 | A1* | 9/2010 | Asami | G06F 3/014 |
| | | | | 341/20 |
| 2010/0220054 | A1* | 9/2010 | Noda | G06F 3/014 |
| | | | | 345/156 |
| 2012/0293410 | A1 | 11/2012 | Bell | |
| 2012/0319940 | A1* | 12/2012 | Bress | G06F 3/014 |
| | | | | 345/156 |
| 2015/0277559 | A1 | 10/2015 | Vescovi et al. | |
| 2016/0034742 | A1* | 2/2016 | Kim | G06V 40/1365 |
| | | | | 382/124 |
| 2016/0165450 | A1* | 6/2016 | Hunt | G06F 3/0416 |
| | | | | 726/19 |
| 2018/0153430 | A1* | 6/2018 | Ang | A61B 5/24 |
| 2018/0220923 | A1 | 8/2018 | Shim et al. | |
| 2018/0275799 | A1 | 9/2018 | Shin et al. | |
| 2020/0142497 | A1 | 5/2020 | Zhu et al. | |
| 2020/0401183 | A1 | 12/2020 | von Badinski et al. | |
| 2021/0058692 | A1 | 2/2021 | Shankar | |
| 2021/0089126 | A1 | 3/2021 | Nickerson | |
| 2021/0303069 | A1* | 9/2021 | Beyhs | G06F 3/014 |

FOREIGN PATENT DOCUMENTS

| | | |
|---|---|---|
| KR | 10-2014-0016122 A | 2/2014 |
| KR | 10-2017-0010704 A | 2/2017 |
| KR | 10-2018-0066503 A | 6/2018 |
| KR | 10-2018-0108313 A | 10/2018 |
| KR | 10-1933289 B1 | 12/2018 |

* cited by examiner

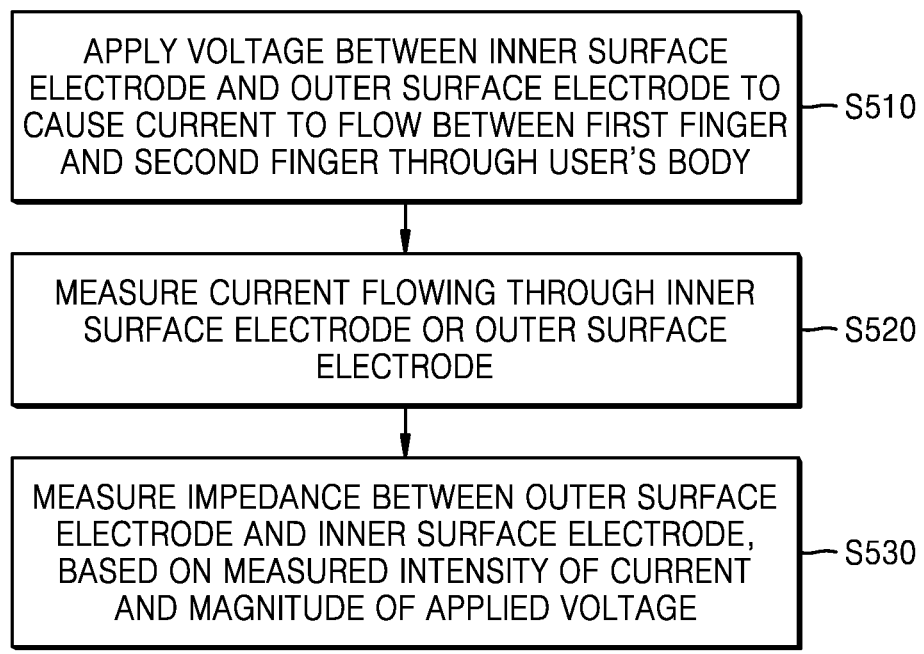

WEARABLE DEVICE AND METHOD FOR CONTROLLING SAME

CROSS-REFERENCE TO RELATED APPLICATIONS

This application is a bypass continuation application of International Application No. PCT/KR2022/008403, filed on Jun. 14, 2022, which is based on and claims priority to Korean Patent Application No. 10-2021-0077422, filed on Jun. 15, 2021, in the Korean Intellectual Property Office, the disclosures of which are incorporated by reference herein in their entireties.

BACKGROUND

1. Field

The disclosure relates to a wearable device worn on a finger and a method of controlling the wearable device worn on the finger, and more particularly, to a device and method for identifying a body part contacting a wearable device when the wearable device is worn on a finger and a signal is input in a contact manner.

2. Description of Related Art

As functions of mobile devices have become increasingly diverse, the mobile devices have been implemented in the form of multimedia devices, and structural and software parts of the devices have been improved. Recently, among various mobile devices, the use of wearable devices such as smart watches, smart glasses, head mounted displays (HMDs), smart rings, and the like has been increasing. Among them, a smart ring worn on a user's finger is sometimes used alone, but due to its very small size, the smart ring often performs various operations in conjunction with other electronic devices.

On the other hand, input methods through the smart ring are limited. The user may control a smart ring using a voice command or via a touch input. However, when controlling a smart ring via a touch input, there is a limit in distinguishing between various input signals or providing precise manipulation due to the small area of the smart ring. Therefore, a technology for enabling control of more operations in a limited touch area is required.

SUMMARY

Provided are a wearable device and method capable of identifying a body part touching the wearable device worn on a user's finger by measuring an impedance between an inner surface electrode and an outer surface electrode.

Further, provided are a wearable device and method capable of controlling two or more operations even when the same pattern of touch input is received by matching different operations with different types of body parts that touch wearable device worn on a user's finger and capable of controlling various operations in a limited touch area.

Additional aspects will be set forth in part in the description which follows and, in part, will be apparent from the description, or may be learned by practice of the presented embodiments.

According to an aspect of the disclosure, a method of controlling a wearable device worn on a finger of a user, may include: sensing a contact by a second finger of the user via an outer surface electrode located on an outer circumferential surface of the wearable device worn on a first finger of the user; based on the sensing of the contact, measuring an impedance between the outer surface electrode and an inner surface electrode that is in contact with the first finger of the user; identifying a type of the second finger based on the impedance; and controlling an operation of the wearable device based on the type of the second finger.

The measuring of the impedance between the outer surface electrode and the inner surface electrode may include: applying a voltage between the inner surface electrode and the outer surface electrode to cause an applied current to flow through a body of the user between the first finger and the second finger; measuring a measured current flowing through the inner surface electrode or the outer surface electrode; and obtaining the impedance between the outer surface electrode and the inner surface electrode, based on an intensity of the measured current and a magnitude of the voltage.

The type of the second finger may include a first type and a second type, the second finger that is of the first type may belong to a same hand as the first finger, and the second finger that is of the second type may belong to a different hand than the first finger. The identifying of the type of the second finger may include: comparing a magnitude of the impedance with a preset threshold; identifying the type of the second finger as the first type based on the magnitude of the impedance being less than the preset threshold; and identifying the type of the second finger as the second type based on the magnitude of the impedance being greater than or equal to the preset threshold.

The outer surface electrode may include a plurality of outer surface electrode units, and the plurality of outer surface electrode units may be arranged at preset intervals along the outer circumferential surface of the wearable device.

The method may further include obtaining a touch input from the contact by the second finger of the user. The controlling of the operation of the wearable device based on the type of the second finger may include: identifying a pattern of the touch input; identifying a corresponding operation of the wearable device corresponding to the pattern of the touch input and the type of the second finger; and controlling the wearable device based on the corresponding operation.

The pattern of the touch input may be determined based on a touch duration of the touch input, a number of touches in the touch input, and whether the touch input includes a dragging operation.

The outer surface electrode may include a fingerprint recognition sensor. The method may further include: recognizing, in response to the sensing of the contact by the second finger of the user, a fingerprint for the second finger via the fingerprint recognition sensor; identifying the type of the second finger based on the fingerprint; and verifying the type of the second finger identified based on the impedance by comparing the type of the second finger identified based on the fingerprint with the type of the second finger identified based on the impedance.

The controlling of the operation of the wearable device based on the type of the second finger may include: generating a control signal for controlling an operation of another electronic device connected to the wearable device via wireless short-range communication based on the type of the second finger; and controlling the operation of the wearable device to transmit the control signal to the other electronic device.

According to an aspect of the disclosure, a wearable device for obtaining a control signal, may include: a body portion including at least one through insertion hole; an inner surface electrode located on an internal surface of the body portion, the inner surface electrode being configured to contact a first finger of a user; an outer surface electrode located on an external surface of the body portion, the outer surface electrode being configured to contact a second finger of the user; a power source; a storage storing a program including at least one instruction; and at least one processor configured to execute the at least one instruction stored in the storage to sense a contact by the second finger via the outer surface electrode, based on sensing the contact, measure an impedance between the outer surface electrode and the inner surface electrode, identify a type of the second finger based on the impedance, obtain a touch input from the contact by the second finger, identify a pattern of the touch input, identify a corresponding operation corresponding to the pattern of the touch input and the type of the second finger, and obtain a control signal for the corresponding operation.

The at least one processor may be further configured to execute the at least one instruction to control the power source to apply a voltage between the inner surface electrode and the outer surface electrode to cause an applied current to flow through a body of the user between the first finger and the second finger, measure a measured current flowing through the inner surface electrode or the outer surface electrode, and obtain the impedance between the outer surface electrode and the inner surface electrode, based on an intensity of the measured current and a magnitude of the voltage.

The type of the second finger may include a first type and a second type, the second finger that is of the first type may belong to a same hand as the first finger, and the second finger that is of the second type may belong to a different hand than the first finger, and the at least one processor may be further configured to execute the at least one instruction to compare a magnitude of the impedance with a preset threshold, identify the type of the second finger as the first type based on the magnitude of the impedance being less than the preset threshold, and identify the type of the second finger as the second type based on the magnitude of the impedance being greater than or equal to the preset threshold.

The outer surface electrode may include a plurality of outer surface electrode units, and the plurality of outer surface electrode units may be arranged at preset intervals along the external surface of the wearable device.

The pattern of the touch input may be determined based on a touch duration of the touch input, a number of touches in the touch input, and whether the touch input includes a dragging operation.

The outer surface electrode may include a fingerprint recognition sensor, and the at least one processor may be further configured to execute the at least one instruction to recognize, in response to the sensing of the contact by the second finger of the user, a fingerprint for the second finger via the fingerprint recognition sensor, identify the type of the second finger based on the fingerprint, and verify the type of the second finger identified based on the impedance by comparing the type of the second finger identified based on the fingerprint with the type of the second finger identified based on the impedance.

The wearable device may further include a communication unit configured to perform wireless short-range communication with another electronic device. The at least one processor may be further configured to execute the at least one instruction to generate the control signal for controlling an operation of the other electronic device connected via the wireless short-range communication, based on the type of the second finger and the touch input, and control the communication unit to transmit the control signal to the other electronic device.

According to an aspect of the disclosure, a wearable device may include: an inner surface electrode located on an internal surface of the wearable device, the inner surface electrode being configured to contact a first finger on a first hand of a user; an outer surface electrode located on an external surface of the wearable device; at least one memory storing a program including at least one instruction; and at least one processor configured to execute the at least one instruction stored in the at least one memory to: based on a contact between a second finger of the user and the outer surface electrode, measure an impedance between the outer surface electrode and the inner surface electrode, based on the impedance, determine a location of the second finger on the first hand or a second hand of the user, based on the location of the second finger being on the first hand, execute a first operation, and based on the location of the second finger being on the second hand, execute a second operation different from the first operation.

The wearable device may further include a power source. The at least one processor may be further configured to execute the at least one instruction to control the power source to apply a voltage between the inner surface electrode and the outer surface electrode to cause an applied current to flow through a body of the user between the first finger and the second finger, measure a measured current flowing through the inner surface electrode or the outer surface electrode, and obtain the impedance between the outer surface electrode and the inner surface electrode, based on an intensity of the measured current and a magnitude of the voltage.

The at least one processor may be further configured to execute the at least one instruction to compare a magnitude of the impedance with a preset threshold, determine that the location of the second finger is on the first hand based on the magnitude of the impedance being less than the preset threshold, and determine that the location of the second finger is on the second hand based on the magnitude of the impedance being greater than or equal to the preset threshold.

The outer surface electrode may include a fingerprint recognition sensor. The at least one processor may be further configured to execute the at least one instruction to recognize a fingerprint for the second finger via the fingerprint recognition sensor, determine the location of the second finger based on the fingerprint, and verify whether the location of the second finger based on the impedance by comparing the location of the second finger identified based on the fingerprint with the location of the second finger identified based on the impedance.

The wearable device may further include: a communication unit configured to perform wireless short-range communication with another electronic device. The at least one processor may be further configured to execute the at least one instruction to obtain a touch input from the contact by the second finger, identify an operation of the other electronic device corresponding to the touch input and the location of the second finger, generate a control signal for controlling the operation of the other electronic device, and control the communication unit to transmit the control signal to the other electronic device.

DESCRIPTION OF DRAWINGS

The above and other aspects, features, and advantages of certain embodiments of the present disclosure will be more apparent from the following description taken in conjunction with the accompanying drawings, in which:

FIG. 5 is a diagram for describing an operation of measuring an impedance between an outer surface electrode and an inner surface electrode, according to an embodiment of the disclosure;

DETAILED DESCRIPTION

Figure 1:
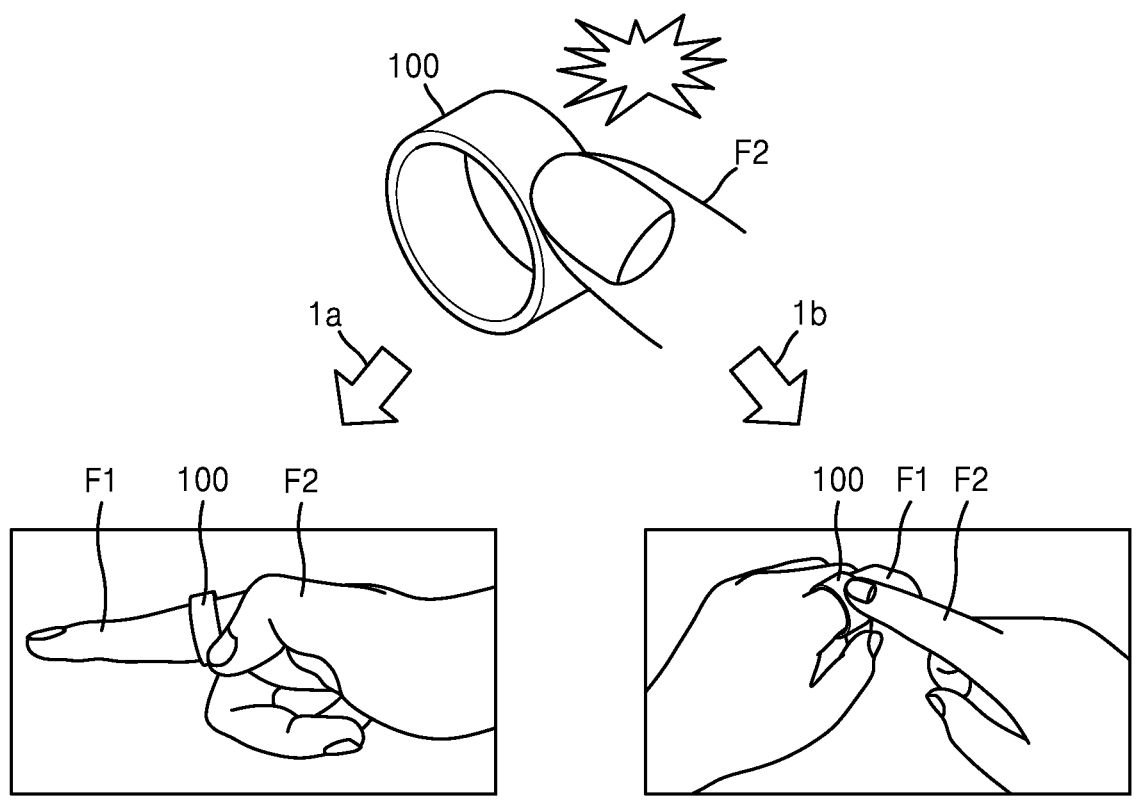
FIG. 1 is a schematic diagram illustrating a method of identifying a type of a finger of a user touching a wearable device and controlling the wearable device worn on a finger of the user based on the identified type of the finger, according to an embodiment of the disclosure.

Embodiments of the disclosure will now be described more fully hereinafter with reference to the accompanying drawings so that they may be easily implemented by one of ordinary skill in the art. However, the disclosure may be implemented in different forms and is limited to the embodiments set forth herein. In addition, parts not related to descriptions of the disclosure are omitted to clearly explain the disclosure in the drawings, and like reference numerals denote like elements throughout the specification.

As the terms used herein, general terms that are currently widely used are selected by taking functions according to the disclosure into account, but may be changed according to the intention of one of ordinary skill in the art, precedent cases, or advent of new technologies. Furthermore, specific terms may be arbitrarily selected by the applicant, and in this case, the meaning of the selected terms will be described in detail in the detailed description of a corresponding embodiment. Thus, the terms used herein should be defined not by simple appellations thereof but based on the meaning of the terms together with the overall description of the disclosure.

Singular expressions used herein are intended to include plural expressions as well unless the context clearly indicates otherwise. All the terms used herein, which include technical or scientific terms, may have the same meaning that is generally understood by one of ordinary skill in the art.

Throughout the disclosure, when a part "includes" or "comprises" an element, unless there is a particular description contrary thereto, the part may further include other elements, not excluding the other elements. Furthermore, terms, such as "portion," "module," etc., used herein indicate a unit for processing at least one function or operation and may be embodied as hardware or software or a combination of hardware and software.

Throughout the specification, it will be understood that when an element is referred to as being "connected" or "coupled" to another element, it can be "directly connected" to or "electrically coupled" to the other element with one or more intervening elements therebetween.

The expression "configured to (or set to)" used herein may be used interchangeably, according to context, with, for example, the expression "suitable for," "having the capacity to," "designed to," "adapted to," "made to," or "capable of". The term "configured to (or set to)" may not necessarily mean only "specifically designed to" in terms of hardware. Instead, the expression "a system configured to" may mean, in some contexts, the system being "capable of", together with other devices or components. For example, the expression "a processor configured to (or set to) perform A, B, and C" may mean a dedicated processor (e.g., an embedded processor) for performing the corresponding operations, or a general-purpose processor (e.g., a central processing unit (CPU) or an application processor (AP)) capable of performing the corresponding operations by executing one or more software programs stored in at least one memory.

In the disclosure, 'impedance (Z)' may represent a sum of resistances undergone when an electrical signal passes through a circuit or device. For example, impedance may be a value of opposition to a flow of current in a circuit when a voltage is applied. The value of impedance may be expressed as a ratio between voltage and current across the circuit and depend on a frequency of an alternating current (AC) voltage. Impedance may be represented as a complex number and have a unit of Ohm ($\Omega$).

Hereinafter, the disclosure is described in detail with reference to the accompanying drawings.

FIG. 1 is a schematic diagram illustrating a method of identifying a type of a second finger F2 of a user touching a wearable device 100 and controlling the wearable device 100 worn on a first finger F1 of the user based on the identified type of the second finger F2, according to an embodiment of the disclosure.

Referring to FIG. 1, the wearable device 100 may include a smart ring, and the wearable device 100 of a ring type may be worn on the first finger F1 of the user. In an embodiment, the wearable device 100 may have a cylindrical shape or a donut shape. A surface of the wearable device 100 having a cylindrical shape may be divided into an inner circumferential surface (internal surface) in the direction of the finger on which the wearable device 100 is worn and an outer circumferential surface (external surface) in the opposite direction of the finger. The wearable device 100 may be worn on one finger or may be worn across a plurality of fingers.

In an embodiment, a touch sensor may be included on the external surface of the wearable device 100 to sense a contact by a part of a user's body and receive a touch input from the user. For example, the touch sensor may include a touch screen. The user may touch the external surface of the wearable device 100 worn on the first finger F1 with the second finger F2. A touch input may be generated when the user touches the external surface of the wearable device 100 with the second finger F2.

An operation in which the user touches the wearable device 100 with the second finger F2 may be classified into at least two types. In a first type 1a, the user may touch the external surface of the wearable device 100 by using a second finger F2 of the same hand as a first finger F1 on which the wearable device 100 is worn. In a second type 1b, the user may touch the external surface of the wearable device 100 by using a second finger F2 of a different hand than a first finger F1.

In a method of controlling the wearable device 100 worn on a finger of the user based on a touch input, according to an embodiment of the disclosure, the wearable device 100 may distinguish between types 1a and 1b of the second finger F2 that generate touch inputs and identify different control commands respectively corresponding to the touch inputs generated by the different types 1a and 1b of the second finger F2 (corresponding to first and second different operations of the device). As described in detail below, by distinguishing between the types 1a and 1b of the second finger F2 that generate touch inputs, various operations of the wearable device 100 and another electronic device connected thereto may be controlled even through a limited touch area.

Figure 2:
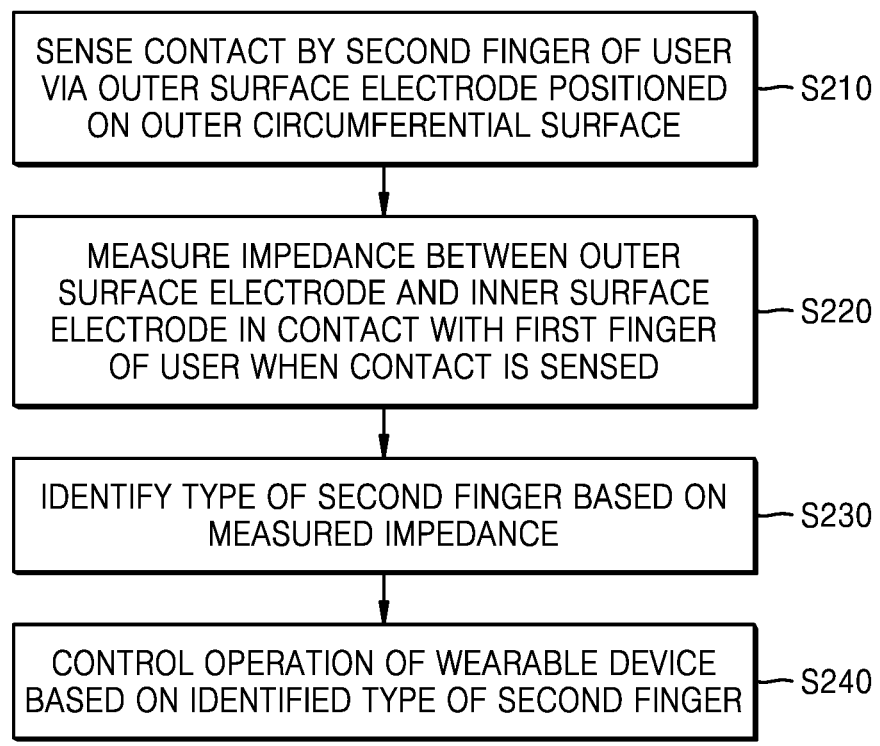
FIG. 2 is a flowchart of a method of controlling a wearable device worn on a finger of a user, according to an embodiment of the disclosure.

FIG. 2 is a flowchart of a method of controlling a wearable device worn on a finger of a user, according to an embodiment of the disclosure.

In operation S210, a touch input from a user touching a wearable device may be sensed. For example, a contact by a second finger F2 of the user may be sensed via an outer surface electrode positioned on an outer circumferential surface of the wearable device worn on the first finger F1 of the user.

The wearable device may be worn on a first finger F1 of the user. In an embodiment, when the user wears the wearable device on the first finger F1, an internal surface (inner circumferential surface) of the wearable device may contact the first finger F1. In an embodiment, when the user wears the wearable device across a plurality of first fingers F1, the inner circumferential surface of the wearable device may contact at least one of the plurality of first fingers F1. In an embodiment, at least one inner surface electrode may be positioned on the inner circumferential surface of the wearable device. In this case, the at least one first finger F1 on which the wearable device is worn may contact at least one inner surface electrode included in the wearable device.

The user may touch the outer circumferential surface of the wearable device worn on the first finger F1 with the second finger F2. When the user touches the wearable device with the second finger F2, the contact by the second finger F2 may be sensed. In an embodiment, an outer surface electrode may be positioned on the outer circumferential surface of the wearable device. In an embodiment, an operation of the user touching the outer circumferential surface of the wearable device with the second finger F2 may include an operation of touching the outer surface electrode positioned on the outer circumferential surface with the second finger F2. For example, when the user touches the outer surface electrode included in the wearable device with the second finger F2, the contact by the second finger F2 may be sensed. In an embodiment, the wearable device may obtain a touch input from the contact by the second finger F2 of the user.

In operation S220, in response to the contact by the second finger F2 of the user being sensed, an impedance Z between the outer surface electrode and an inner surface electrode in contact with the first finger F1 of the user may be measured. For example, the wearable device may measure impedance Z through a user's body between the user's first finger F1 contacting the inner surface electrode and the user's second finger F2 contacting the outer surface electrode.

In an embodiment, an impedance measuring portion may be included between the outer surface electrode and the inner surface electrode on the inside of the wearable device. For example, the impedance measuring portion may include at least one of a voltmeter and an ammeter.

In an embodiment, when parts of the user's body respectively contact the outer surface electrode and the inner surface electrode, a closed circuit is formed that includes the inner surface electrode, the impedance measuring portion, the outer surface electrode, and the user's body. A current emitted by the wearable device via the inner surface electrode or outer surface electrode may flow through the formed closed circuit, or a current may flow due to a voltage difference between the inner surface electrode and outer surface electrode. By measuring the current flowing in the closed circuit or by measuring a voltage applied between the inner surface electrode and the outer surface electrode, the impedance measuring portion may measure a body impedance Z due to the inner surface electrode and the outer surface electrode respectively contacting parts of the user's body.

In operation S230, a type of the second finger F2 may be identified based on the measured impedance. For example, the type of the second finger F2 may include a first type TYPE1 and a second type TYPE2. In an embodiment, the first type TYPE1 and the second type TYPE2 may be determined based on whether the second finger F2 performing the touch operation is on the same hand as the first finger F1 on which the wearable device is worn. The second finger F2 that is of the first type TYPE1 may belong to the same hand as the first finger F1. The second finger F2 that is of the second type TYPE2 may belong to a different hand than the first finger F1.

For example, if the user wears the wearable device on the index finger on the right hand, the first finger F1 is the index finger on the right hand. In this case, the other fingers on the user's right hand, except for the index finger, may be of the first type TYPE1, and the fingers on the user's left hand may be of the second type TYPE2.

In operation S240, an operation of the wearable device may be controlled based on the identified type of the second finger F2. In an embodiment, the wearable device may be controlled to generate a control signal for controlling the wearable device itself being worn or another electronic device connected thereto via a network according to the identified type of the second finger F2.

In an embodiment, the wearable device may receive a touch input via the external surface. In an embodiment, the touch input may be obtained from a sensed contact by a second finger of the user. On the other hand, a type of wearable device worn on a finger has a small area of external surface due to its natural characteristics. Accordingly, the finger-worn wearable device has limitations in distinguishing various types of touch inputs or recognizing delicate touch operations due to its small area of the external surface.

In an embodiment, the wearable device may recognize patterns of touch inputs and match different control commands to different touch inputs. A pattern of a touch input may be determined based on factors such as, for example, a touch location of the touch input, a touch duration of the touch input, the number of touches in the touch input, and whether the touch input includes a dragging operation. If all factors for two touch inputs are the same, the two touch inputs may be regarded as having the same pattern. If at least one factor in the two touch inputs is different, the two touch inputs may be regarded as having different patterns.

In an embodiment, when the wearable device recognizes patterns of touch input and matches different control commands to different touch inputs, in the case of a finger-worn wearable device, due to a limited touch area (external surface), the number of patterns of touch inputs is limited, and furthermore, the number of operations controllable via touch inputs is limited.

In an embodiment of the disclosure, a body part touching the wearable device worn on the user's finger may be identified by measuring an impedance Z between the inner surface electrode and the outer surface electrode. In an embodiment, by matching different operations with identified different types of body parts, it is possible to control two or more operations even when a touch input of the same pattern is received.

For example, when the number of patterns of touch inputs that the wearable device is able to sense is m, if the type of the second finger F2 touching the wearable device is not identified, the same control command may correspond to all touch inputs having the same pattern, and as a result, the wearable device may perform up to m control operations.

On the other hand, if the second finger F2 touching the wearable device is identified as the first type TYPE1 and the second type TYPE2 as described above, a touch input having the same pattern may correspond to two different control commands according to the identified type (i.e. first and second different operations of the device), and as a result, the wearable device may perform up to 2*m control operations.

Furthermore, if the second finger F2 touching the wearable device is subdivided into and identified as n types (e.g., identified as each finger), or body parts not limited to fingers touching the wearable device are identified as n types, a touch input having the same pattern may correspond to n different control commands according to the identified types, and as a result, the wearable device may perform up to n*m control operations.

In this way, by identifying the type of the user's body part touching the wearable device, various control operations may be performed even by a touch input via a limited touch area of the wearable device.

In an embodiment, the user may touch the wearable device worn on the first finger F1 with two or more second fingers F2. In this case, a touch by each of the second fingers F2 per contact point may be regarded as a separate touch input, or a combination of touches by one or more second fingers F2 may be regarded as a single touch input.

According to an embodiment of the disclosure, an operation of identifying a type of a body part performing a touch input by measuring the impedance between a body part where the wearable device is worn and the body part touching the wearable device is not limited to a case where the body part is a finger. For example, the operation of identifying the type of body part performing the touch input may also be applied when the wearable device worn on the user's finger is touched with another body part, such as an elbow, chin, or nose, or when an earring-type wearable device worn on the user's ear is touched with the wrist or both hands.

Figure 3A:
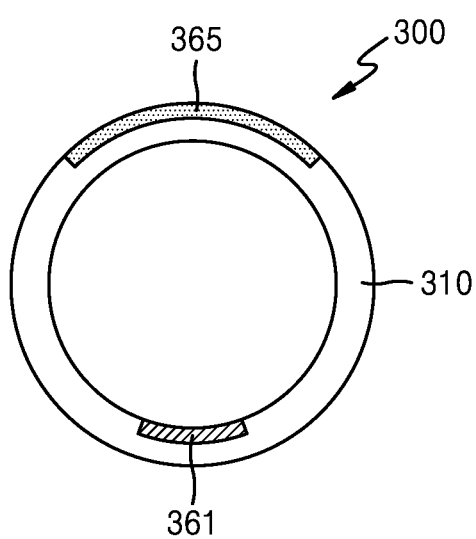
FIG. 3A is a diagram illustrating a wearable device according to an embodiment of the disclosure.
Figure 3B:
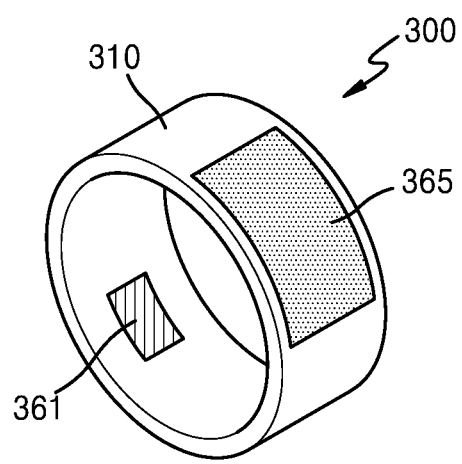
FIG. 3B is a diagram illustrating a wearable device according to an embodiment of the disclosure.

FIGS. 3A and 3B are diagrams illustrating a wearable device 300 according to an embodiment of the disclosure.

FIG. 3A is a cross-sectional view of the wearable device 300 according to an embodiment of the disclosure, and FIG. 3B is a perspective view of the wearable device 300 according to an embodiment of the disclosure. Referring to FIGS. 3A and 3B, the wearable device 300 may include an inner surface electrode 361 disposed on an internal surface thereof and an outer surface electrode 365 disposed on an external surface.

In an embodiment, the inner surface electrode 361 may be formed on the entire internal surface of the wearable device 300, but may also be formed on at least a portion of the internal surface as illustrated in FIGS. 3A and 3B. In an embodiment, when the wearable device 300 is worn on the first finger F1 of the user, at least a portion of the internal surface of the wearable device 300 is in contact with the first finger F1 of the user, so the inner surface electrode 361 may not be formed on the entire internal surface of the wearable device 300, but only on at least a portion of the internal surface.

In an embodiment, the outer surface electrode 365 may be formed on the entire external surface of the wearable device 300, but may also be formed on at least a portion of the external surface as illustrated in FIGS. 3A and 3B. In an embodiment, when the wearable device 300 has a directional angular shape instead of a non-directional cylindrical or doughnut shape, the outer surface electrode 365 may be formed on at least a portion of the external surface in consideration of a direction in which the wearable device 300 is worn. In an embodiment, when the wearable device 300 has a directionality, to prevent unintended touch input caused by fingers adjacent to the finger on which the wearable device 300 is worn, the outer surface electrode 365 may be disposed on the external surface by taking into account the directionality of the wearable device 300 and positions of the adjacent fingers.

In an embodiment, the outer surface electrode 365 may include a fingerprint recognition sensor. The fingerprint recognition sensor may include, for example, at least one of an optical fingerprint recognition sensor, a capacitive fingerprint recognition sensor, or an ultrasonic fingerprint recognition sensor.

In an embodiment, in response to sensing a touch input, the wearable device 300 may recognize a fingerprint for the second finger F2 via the fingerprint recognition sensor included in the outer surface electrode 365. The recognized fingerprint may be used in an operation of verifying the type of the second finger F2 identified based on the impedance Z. For example, the wearable device 300 may separately identify a type of the second finger F2 based on the recognized fingerprint, compare the type of the second finger F2 identified based on the fingerprint with the type of the second finger F2 identified based on the impedance Z, and verify the type of the second finger F2 identified based on the impedance Z.

Figure 4A:
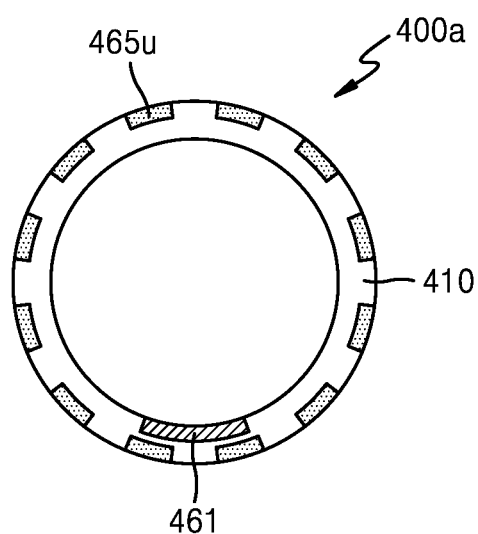
FIG. 4A is a diagram illustrating a wearable device according to an embodiment of the disclosure.
Figure 4B:
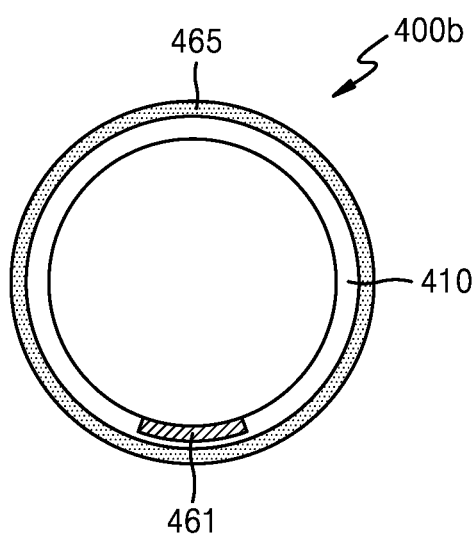
FIG. 4B is a diagram illustrating a wearable device according to an embodiment of the disclosure.

FIGS. 4A and 4B are diagrams illustrating wearable devices 400a and 400b according to various embodiments of the disclosure.

Referring to FIGS. 4A and 4B, the wearable devices 400a and 400b may each include an inner surface electrode 461 disposed on an internal surface thereof and an outer surface electrode 465 disposed on an external surface.

In an embodiment, the inner surface electrode 461 may be formed on the entire internal surface of the wearable device 400a or 400b, but may also be formed on at least a portion of the internal surface as illustrated in FIGS. 4A and 4B. In an embodiment, when the wearable device 400a or 400b is worn on the first finger F1 of the user, at least a portion of the internal surface of the wearable device 400a or 400b is in contact with the first finger F1 of the user, so the inner surface electrode 461 may not be formed on the entire internal surface of the wearable device 400a or 400b, but only on at least a portion of the internal surface.

Referring to FIG. 4A, in the wearable device 400a according to an embodiment, the outer surface electrode 465 may include a plurality of outer surface electrode units 465u. The plurality of outer surface electrode units 465u may be arranged at preset intervals along an outer circumferential surface of a body portion 410 of the wearable device 400a. As the outer surface electrode units 465u are arranged at the preset intervals on the outer circumferential surface of the wearable device, the user may be able to easily contact the outer surface electrode without paying much attention to a location of the outer surface electrode.

In an embodiment, contact by the second finger F2 of the user may include a plurality of touch inputs. The plurality of touch inputs may be identified by contact points included in the sensed 'contact event'. A contact point may be identified based on the outer surface electrode unit 465u and a body part. For example, contact via the different outer surface electrode units 465u may include two or more contact points, and even contact via one outer surface electrode unit 465u may include a plurality of contact points if the contact is made by different body parts or if a contact part is not continuous. In an embodiment, the sensed contact may correspond to a plurality of touch inputs according to the contact points included in the contact.

In an embodiment, a plurality of touch inputs obtained via different outer surface electrode units 465u may respectively correspond to control signals for different operations. For example, if the user touches each of the two outer surface electrode units 465u with two second fingers F2, the touch inputs respectively via the two outer surface electrode units 465u may correspond to control signals for two different operations. In an embodiment, one control signal may correspond to a combination of a plurality of touch inputs obtained via the different outer surface electrode units 465u. For example, when the user broadly touches two adjacent outer surface electrode units 465u with one second finger F2, a control signal related to one operation may correspond to a combination of touch inputs via the two adjacent outer surface electrode units 465u. However, a correspondence relationship between the plurality of outer surface electrode units 465u, the plurality of touch inputs, and the plurality of control signals is not limited to the illustrated embodiment and may be implemented in various combinations.

Referring to FIG. 4B, in the wearable device 400b according to an embodiment, the outer surface electrode 465 may be positioned entirely along an outer circumferential surface of a body portion 410 of the wearable device 400b. In this case, this may eliminate the user's inconvenience of having to accurately touch a predetermined location of the outer surface electrode (e.g., 365 in FIG. 3) on the wearable device 400b in order to generate a touch input.

Moreover, in the wearable device according to an embodiment of the disclosure, the arrangement, number, and shape of inner surface electrodes or outer surface electrodes are not limited to the above examples and may be implemented in various ways.

FIG. 5 is a diagram for describing an operation of measuring impedance Z between an outer surface electrode and an inner surface electrode, according to an embodiment of the disclosure.

In operation S510, a wearable device may apply a voltage between an inner surface electrode and an outer surface electrode to cause a current to flow through a user's body between a first finger F1 and a second finger F2.

According to an embodiment of the disclosure, the wearable device may include a power source capable of charging and discharging. For example, the power source may include a battery. In an embodiment, the wearable device may control the power source to apply a voltage between the inner surface electrode and the outer surface electrode so that a current flows through the user's body between the first finger F1 and the second finger F2.

In an embodiment, the power source and an impedance measuring portion may be included between the outer and inner surface electrodes on the inside of the wearable device. For example, the impedance measuring portion may include at least one of a voltmeter and an ammeter.

In an embodiment, when parts of the user's body respectively contact the outer surface electrode and the inner surface electrode, a closed circuit is formed that includes the inner surface electrode, the power source, the impedance measuring portion, the outer surface electrode, and the user's body.

When the wearable device controls the power source to apply a voltage of a preset magnitude between the inner surface electrode and the outer surface electrode, the voltage of the preset magnitude may be applied between the first finger F1 contacting the inner surface electrode and the second finger F2 contacting the outer surface electrode. In this case, current may flow through the formed closed circuit.

In operation S520, the wearable device may measure a current emitted via the inner surface electrode or the outer surface electrode and flowing through the user's body between the inner surface electrode and the outer surface electrode. In an embodiment, the impedance measuring portion may include an ammeter, and measure the intensity of a current flowing through the inner surface electrode or the outer surface electrode.

In operation S530, the wearable device may calculate an impedance Z between the outer surface electrode and the inner surface electrode, based on the measured intensity I of current and the magnitude V of the applied voltage. In an embodiment, the wearable device may calculate the impedance Z using Ohm's Law $Z=V/I$, based on the measured intensity I of current and the magnitude V of the voltage applied across the inner surface electrode and the outer surface electrode.

Moreover, in an embodiment, a current may be emitted from the power source included in the wearable device. For example, a current from the power source may be emitted via the inner surface electrode or the outer surface electrode. For example, if a current is emitted via the inner surface electrode of the wearable device, the power source may continuously apply the current to the first finger F1 contacting the inner surface electrode, regardless of whether the outer surface electrode is touched by the second finger F2.

In an embodiment, the wearable device may include a power source with a limited battery capacity, and periodically apply a pulse-type current to increase the usable time of the wearable device itself within the limited battery capacity.

Then, the moment when the second finger F2 touches the outer surface electrode, a closed circuit may be formed, and the current emitted from the power source via the inner surface electrode may flow through the formed closed circuit in the order of power source—inner surface electrode—first finger F1—user's body—second finger F2—outer surface electrode.

In an embodiment, the current from the power source may be emitted via the outer surface electrode. The power source may also continuously emit current regardless of whether the second finger F2 touches the outer surface electrode. Then, the moment the second finger F2 touches the outer surface electrode, a closed circuit may be formed, and the current emitted from the power source via the outer surface electrode may flow through the formed closed circuit in the order of power source—outer surface electrode—second finger F2—user's body—first finger F1—inner surface electrode.

In an embodiment, the wearable device may measure a voltage difference V between the inner surface electrode and the outer surface electrode. In an embodiment, the impedance measuring portion may include a voltmeter, and measure a voltage applied between the inner surface electrode and the outer surface electrode.

In an embodiment, the wearable device may calculate the impedance Z between the outer and inner surface electrodes based on the measured voltage difference V and the intensity I of the emitted current. The wearable device may calculate the impedance Z using Ohm's law $Z=V/I$, based on the measured voltage difference V and intensity I of the current emitted via the outer surface electrode or inner surface electrode.

Figure 6:
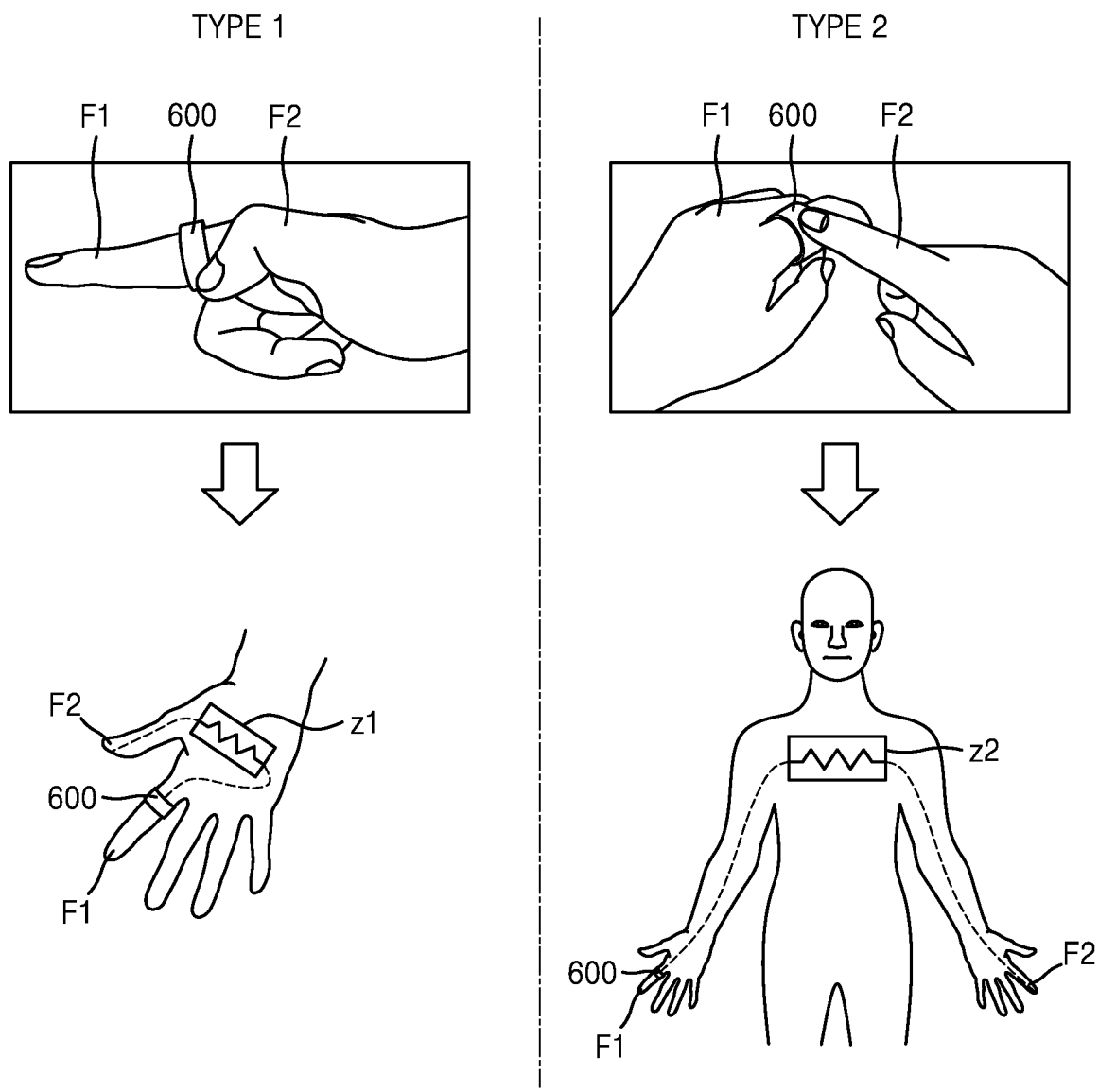
FIG. 6 is a diagram for describing an operation in which a wearable device identifies a type of a user's finger contacting the wearable device, in response to sensing the contact, according to an embodiment of the disclosure.

FIG. 6 is a diagram for describing an operation in which a wearable device 600 identifies a type of a finger F2 of a user contacting the wearable device 600, in response to sensing the contact, according to an embodiment of the disclosure.

In an embodiment, the user may touch an external surface of the wearable device 600 worn on a first finger F1 with the second finger F2. An operation in which the user touches the wearable device 600 with the second finger F2 may be classified into at least two types.

In a first type TYPE1, the user may touch the external surface of the wearable device 600 by using the second finger F2 of the same hand as the first finger F1 on which the wearable device 600 is worn. In a second type TYPE2, the user may touch the external surface of the wearable device 600 by using the second finger F2 of a different hand than the first finger F1 on which the wearable device 600 is worn.

Referring to FIG. 6, it can be seen that magnitudes of impedances z1 and z2 are measured differently in the first type TYPE1 and the second type TYPE2.

In the first type TYPE1, the first finger F1 on which the wearable device 600 is worn and the second finger F2 touching the wearable device 600 are on the same hand. In this case, an electrical pathway through the user's body between a portion of the first finger F1 contacting the inner surface electrode and a portion of the second finger F2 contacting the outer surface electrode may be formed to have a short length. Accordingly, the first impedance z1 measured between the outer surface electrode and the inner surface electrode may have a small magnitude.

In the second type TYPE2, the first finger F1 on which the wearable device 600 is worn and the second finger F2 touching the wearable device 600 are on different hands. In this case, an electrical pathway through the user's body between a portion of the first finger F1 contacting the inner surface electrode and a portion of the second finger F2 contacting the outer surface electrode may be formed to have a sufficient length to pass through a user's torso. Accordingly, the second impedance z2 measured between the outer surface electrode and the inner surface electrode may have a large magnitude.

As described above, the first impedance z1 between the outer and inner surface electrodes measured in the first type TYPE1 may have a relatively small value compared to the second impedance z2 between the outer and inner surface electrodes measured in the second type TYPE2. For example, the value of the first impedance z1 measured in the first type TYPE1 and the value of the second impedance z2 measured in the second type TYPE2 may differ by a factor of 10 or more.

Figure 7:
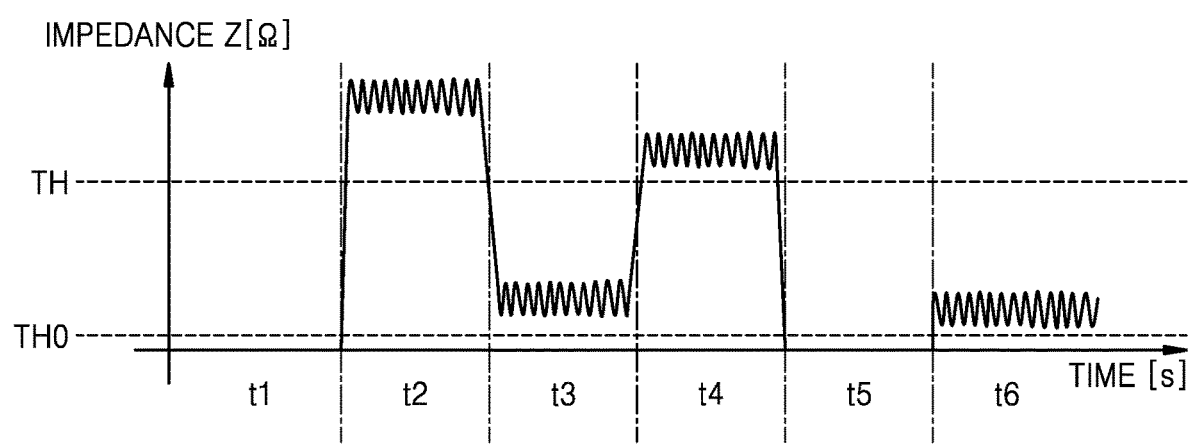
FIG. 7 is a diagram for describing an operation of identifying a type of a user's finger contacting a wearable device by comparing a magnitude of a measured impedance with a preset threshold, according to an embodiment of the disclosure.

FIG. 7 is a diagram for describing an operation of identifying a type of a user's finger contacting a wearable device by comparing a magnitude of a measured impedance Z with a preset threshold TH, according to an embodiment of the disclosure.

In an embodiment, an operation of identifying a type of the second finger F2 touching the wearable device may include an operation of comparing a magnitude of the measured impedance Z with a preset threshold TH and an operation of identifying the type of the second finger F2 based on a comparison result. In detail, in the operation of identifying the type of the second finger F2 based on the comparison result, if the magnitude of the measured impedance Z is less than the preset threshold TH, the type of the second finger F2 may be identified as the first type TYPE1 of FIG. 6, and if the magnitude of the measured impedance Z is greater than or equal to the preset threshold TH, the type of the second finger F2 may be identified as the second type TYPE2 of FIG. 6.

FIG. 7 illustrates an exemplary graph of measured impedance Z values with respect to time t. For example, a minimum threshold TH0 or noise threshold may be a criterion for identifying whether a touch signal (contact) is generated. In an embodiment, when the measured impedance Z value is less than the minimum threshold TH0, it may be determined that A touch input is not received because no contact is sensed. In an embodiment, if the measured impedance Z value is greater than or equal to the minimum threshold TH0 and less than the preset threshold TH for type discrimination, it may be determined that a touch input is received because the contact is sensed, and that the touch input is of a first type TYPE1 as the touch input is received from a finger of the same hand as a finger on which the wearable device is worn. In an embodiment, if the measured impedance Z value is greater than or equal to the preset threshold TH for type discrimination, it may be determined that a touch input is received because the contact is sensed, and that the touch input is of a second type TYPE2 as it is received from a finger of a hand that is not the same as the finger on which the wearable device is worn.

Based on the above determination criteria, referring to FIG. 7, at an interval t1, an impedance Z value that is 0 or less than the minimum threshold TH0 may be measured.

Therefore, it may be considered that no touch input is received during the interval t1. At an interval t2, an impedance Z value that is greater than the preset threshold TH may be measured, and a touch input of the second type TYPE2 may be considered as having been received. At an interval t3, an impedance Z value that is greater than the minimum threshold TH0 but less than the preset threshold TH may be measured, and a touch input of the first type TYPE1 may be considered as having been received. At an interval t4, an impedance Z value that is greater than the preset threshold TH may be measured, and a touch input of the second type TYPE2 may be considered as having been received. At an interval t5, an impedance Z value that is 0 or less than the minimum threshold TH0 may be measured, and it may be considered that no touch input is received. At an interval t6, an impedance Z value that is greater than the minimum threshold TH0 but less than the preset threshold TH may be measured, and a touch input of the first type TYPE1 may be considered as having been received.

In an embodiment, impedance Z of fingers adjacent to the first finger F1 on which the wearable device is worn and included in the same hand, except in the case of the thumb, may be measured very low due to their very close distance through the body. Therefore, if the minimum threshold TH0 for noise removal is set to be greater than an impedance value measured when an adjacent finger unintentionally touches the external surface of the wearable device and less than an impedance value measured when a touch input is intended and performed via the thumb of the same hand or the like, reception of a touch input may be prevented due to being an unintended contact.

In an embodiment, body composition or height may be different depending on users, and therefore, the minimum threshold TH0 for noise removal and the threshold TH for distinguishing a type of a touch input need to be set differently for different users. For example, the minimum threshold TH0 and the threshold TH may be set differently for different users by a preset operation.

Furthermore, when the second finger F2 touching the wearable device is subdivided into and identified as n types (e.g., if identified as each finger), or body parts not limited to fingers touching the wearable device are identified as n types, several different thresholds TH may be set to identify different fingers or different body parts. For example, if the second finger F2 is identified as n types, the minimum threshold TH0 for identifying whether a touch is generated and at least n−1 thresholds TH for distinguishing each type may be set.

Figure 8:
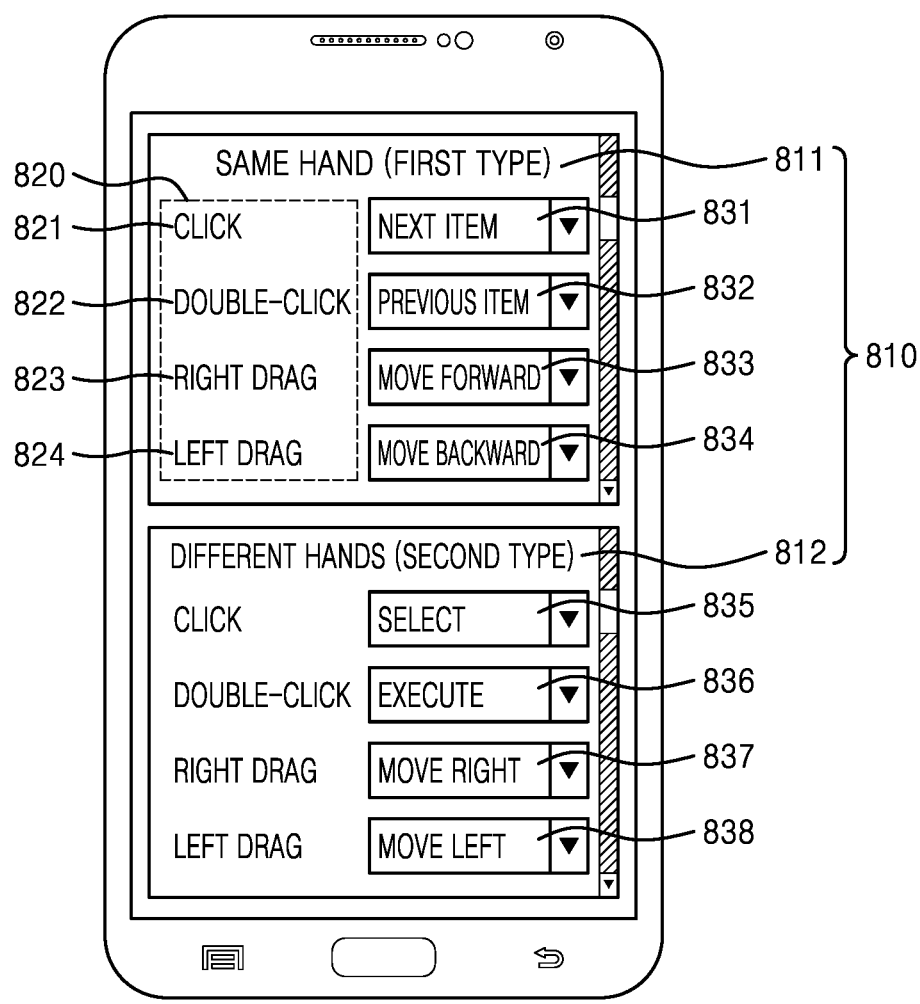
FIG. 8 is a diagram for describing an operation in which an electronic device sets an operation of a wearable device corresponding to a pattern of a touch input and a type of a user's finger contacting the wearable device, according to an embodiment of the disclosure.

FIG. 8 is a diagram for describing an operation in which an electronic device sets control command corresponding to a pattern 820 of touch input and a type 810 of a user's finger contacting a wearable device.

In an embodiment, the wearable device may obtain a touch input from contact by the second finger F2 of the user. Furthermore, the wearable device may identify the pattern 820 of the touch input, and identify an operation of the wearable device corresponding to the identified pattern 820 of the touch input and the identified type 810 of the second finger F2.

Different control commands may correspond to touch inputs having different patterns 820. The pattern 820 of touch input may be determined based on factors such as, for example, a location of the touch input, a touch duration of the touch input, the number of touches in the touch input, and whether the touch input includes a dragging operation. If all factors for two touch inputs are the same, the two touch inputs may be regarded as having the same pattern 820. If at least one factor in the two touch inputs is different, the two touch inputs may be regarded as having different patterns 820.

For example, a first touch input may include a total of two touches, and a first touch may have a longer duration than a second touch. A second touch input may include a total of two touches, but a first touch may have a shorter duration than a second touch. In this case, it may be seen that the first touch input and the second touch input have different patterns 820 even though total times (touch duration) for which the first touch input and the second touch input are respectively maintained are the same and the number of times that contacts occur (the number of touches) for the first and second touch inputs is also 2 in total.

Referring to FIG. 8, the pattern 820 of a touch input may include, for example, a click 821, a double-click 822, a right drag 823, a left drag 824, etc., but is not limited to these examples.

According to an embodiment of the disclosure, one control command 830 may correspond to a pair of one pattern 820 of a touch input and one type 810 of the second finger F2 generating the touch input. For example, the control command 830 may include a control command for controlling an operation of the wearable device itself and a control command for controlling an operation of another electronic device connected to the wearable device via a network such as wireless short-range communication, etc.

Referring to FIG. 8, the control command 830 that may correspond to the touch input includes, for example, move to next item 831, move to previous item 832, move forward 833, move backward 834, select 835, execute 836, move right 837, and move left 838, but is not limited to these examples. For example, a standby (no operation) command may correspond to a specific touch input.

In an embodiment, when the second finger F2 generating a touch input is of a second type 812, a standby command may correspond to a specific pattern 820 of the touch input.

In an embodiment, an operation of matching one control command 830 to a pair of one pattern 820 of a touch input and one type 810 of the second finger F2 generating the touch input may be performed by the wearable device or another electronic device connected to the wearable device via a network such as wireless short-range communication, etc.

In an embodiment, the wearable device may identify a pattern of a touch input, identify a corresponding operation of the wearable device based on the identified pattern of touch input and identified type of second finger F2, and control the wearable device or another electronic device connected thereto based on the identified operation.

In an embodiment, an operation of controlling the wearable device based on an identified type of the second finger F2 and a touch input may include generating, based on the identified type of the second finger F2 and the touch input, a control signal for controlling operations of the wearable device and another electronic device connected to the wearable device via wireless short-range communication, and controlling the wearable device to transmit the generated control signal to the other electronic device.

Figure 9:
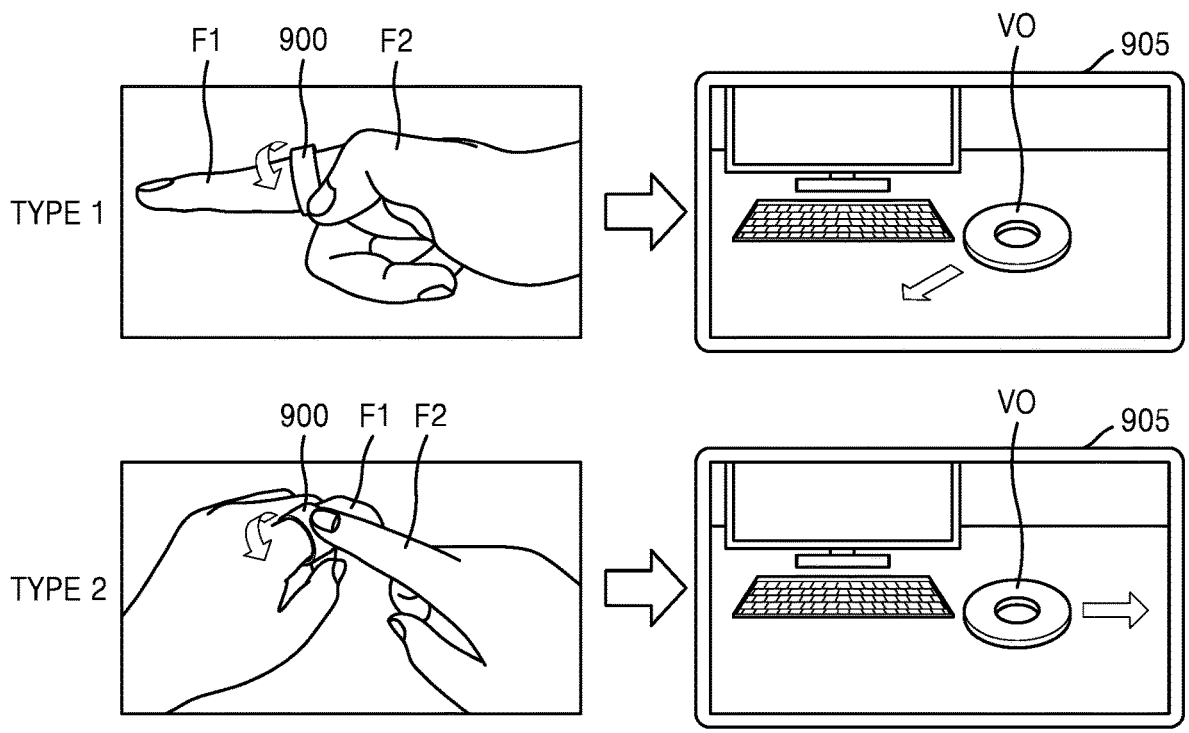
FIG. 9 is a diagram for describing an operation of controlling another electronic device connected via wireless short-range communication, depending on a type of a finger contacting a wearable device worn on a finger of a user, according to an embodiment of the disclosure.

FIG. 9 is a diagram for describing an operation of controlling another electronic device 905 connected via wireless short-range communication, depending on a type of a second finger F2 contacting a wearable device 900 worn on a first finger F1 of a user, according to an embodiment of the disclosure.

In an embodiment, the other electronic device 905 may include, for example, at least one of a digital TV, a desktop computer, a mobile phone, a smart phone, a laptop computer, a digital broadcasting terminal, an e-book reader, a personal digital assistant (PDA), a portable multimedia player (PMP), a navigation device, a slate PC, a tablet PC, a camera, a wearable device (e.g., a smart watch, smart glasses, a head mounted display (HMD)), a virtual reality (VR) device, an augmented reality (AR) device, an extended reality (XR) device, a home appliance, and other mobile or stationary computing devices. However, the electronic device 905 is not limited to the above examples.

The AR device is a device capable of representing AR and may generally include AR glasses in the form of eye glasses worn by the user on the face, an HMD, a VR headset (VRH), or an AR helmet (ARH) worn on the head, etc. In the case of a head-mounted device, a super-large screen may be provided to the user by placing a display in front of the user's eyes, and a realistic virtual world may be provided as the screen moves according to the user's movement.

Referring to FIG. 9, in an embodiment, the electronic device 905 connected to the wearable device 900 is an AR device and may provide an image of a virtual object VO to a user wearing the AR device.

In an embodiment, when a touch input for touching and dragging is generated by a finger F2 of the same hand as a finger F1 on which the wearable device 900 is worn (TYPE 1), an operation of the AR device may be controlled according to a control command corresponding to the touch input. For example, the image of the virtual object VO displayed via the AR device may move forward.

In an embodiment, when a touch input for touching and dragging is generated by a finger F2 of a hand that is not the same as the finger F1 on which the wearable device 900 is worn (TYPE 2), an operation of the AR device may be controlled according to a control command corresponding to the touch input. For example, the image of the virtual object VO displayed via the AR device may move to the right.

As described above, according to an embodiment of the disclosure, even when a touch input of the same pattern is generated, an operation performed by the connected other electronic device 905 may vary depending on the type of the finger F2 generating the corresponding touch input.

Figure 10:
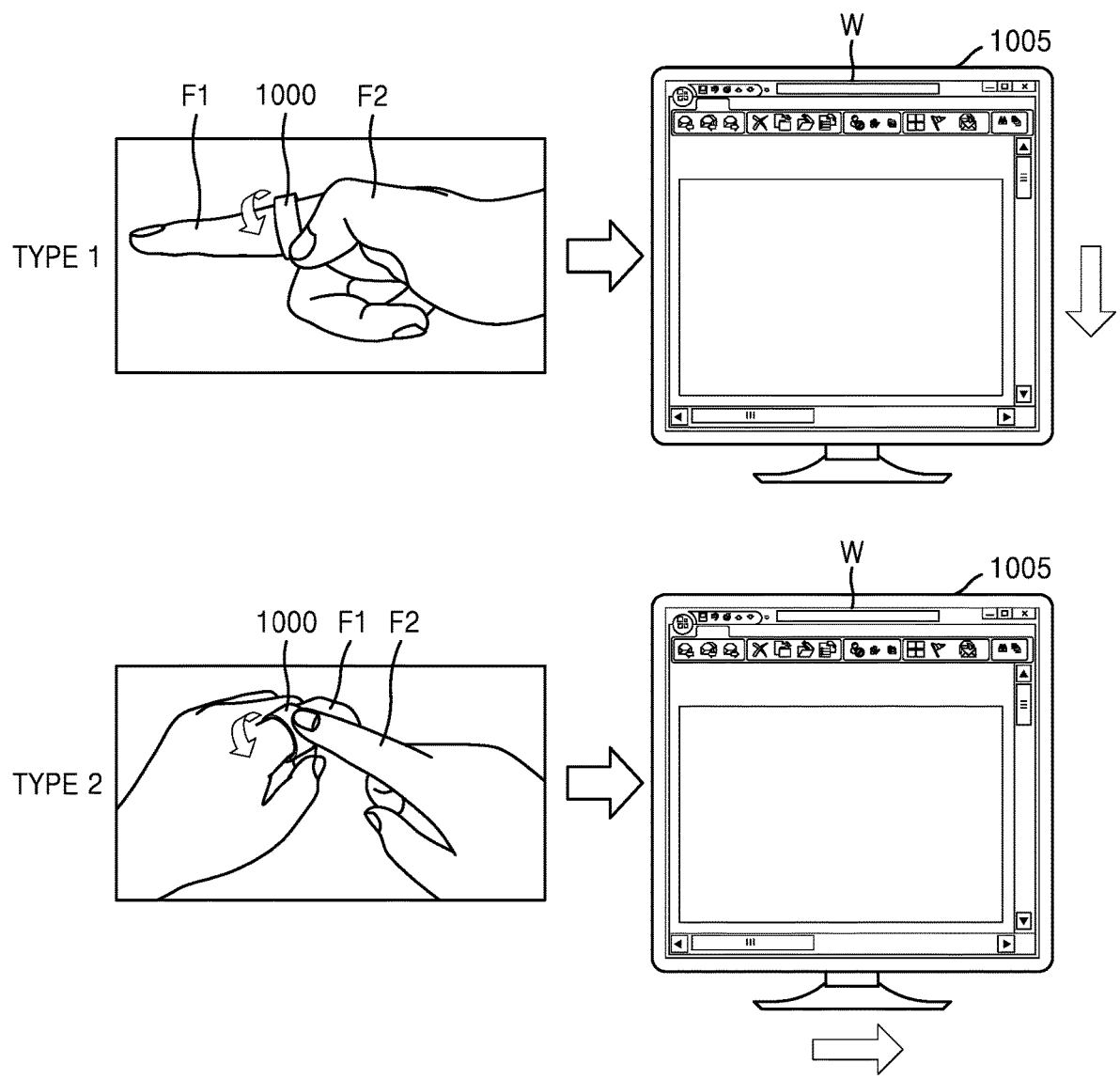
FIG. 10 is a diagram for describing an operation of controlling another electronic device connected via wireless short-range communication according to a type of a finger contacting a wearable device worn on a finger of the user, according to an embodiment of the disclosure.

FIG. 10 is a diagram for describing an operation of controlling another electronic device 1005 connected via wireless short-range communication, depending on a type of a second finger F2 contacting a wearable device 1000 worn on a finger F1 of a user, according to an embodiment of the disclosure.

Referring to FIG. 10, in an embodiment, the electronic device 1005 connected to the wearable device 1000 is a desktop computer and may provide the user with execution windows W for various programs.

In an embodiment, when a touch input for touching and dragging is generated by the finger F2 of the same hand as the finger F1 on which the wearable device 1000 is worn (TYPE 1), an operation of the electronic device 1005 may be controlled according to a control command corresponding to the touch input. For example, a vertical scroll in an execution window W displayed on a desktop computer may move downward.

In an embodiment, when a touch input for touching and dragging is generated by a finger F2 of a hand that is not the same as the finger F1 on which the wearable device 1000 is worn (TYPE 2), an operation of the electronic device 1005 may be controlled according to a control command corresponding to the touch input. For example, a horizontal scroll in the execution window W displayed on the desktop computer may move to the right.

As described above, according to an embodiment of the disclosure, even when a touch input of the same pattern is generated, an operation performed by the connected other electronic device 1005 may vary depending on the type of the finger F2 generating the corresponding touch input.

Figure 11:
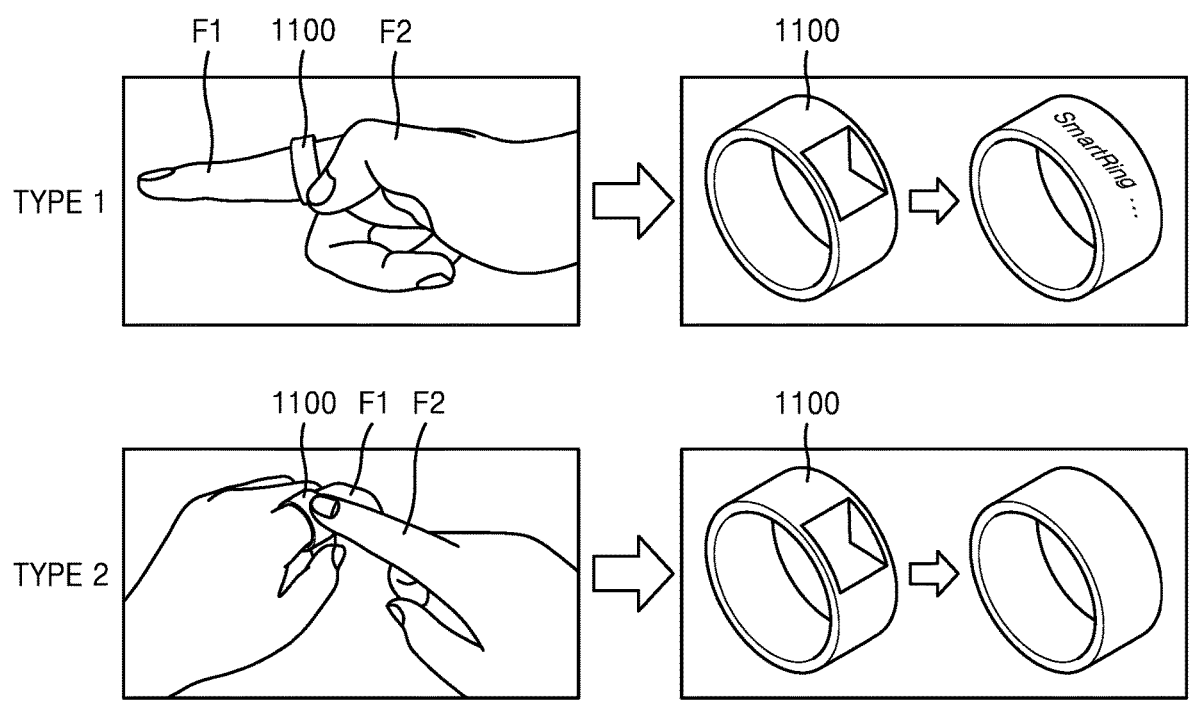
FIG. 11 is a diagram for describing an operation of controlling a wearable device worn on a user's finger, according to an embodiment of the disclosure.

FIG. 11 is a diagram for describing an operation of controlling a wearable device 1100 worn on a finger F1 of a user, according to an embodiment of the disclosure.

Referring to FIG. 11, in an embodiment, the wearable device 1100 is a smart ring and may provide the user with services such as making calls, transmitting and receiving messages, playing music, etc.

In an embodiment, the wearable device 1100 may receive a message and provide an alarm to the user. In this case, when a touch input for touching the wearable device 1100 is generated by a finger F2 of the same hand as the finger F1 on which the wearable device 1100 is worn is generated (TYPE 1), an operation of the wearable device 1100 may be controlled according to a control command corresponding to the touch input. For example, the wearable device 1100 may display the content of the received message (read operation).

In an embodiment, when a touch input for touching the wearable device 1100 is generated by a finger F2 of a hand that is not the same as the finger F1 on which the wearable device 1100 is worn (TYPE 2), an operation of the wearable device 1100 may be controlled according to a control command corresponding to the touch input. For example, the wearable device 1100 may stop providing an alarm without displaying the received message (cancel operation).

As described above, according to an embodiment of the disclosure, even when a touch input of the same pattern is generated, an operation performed by the wearable device 1100 may vary depending on the type of the finger F2 generating the touch input.

Figure 12:
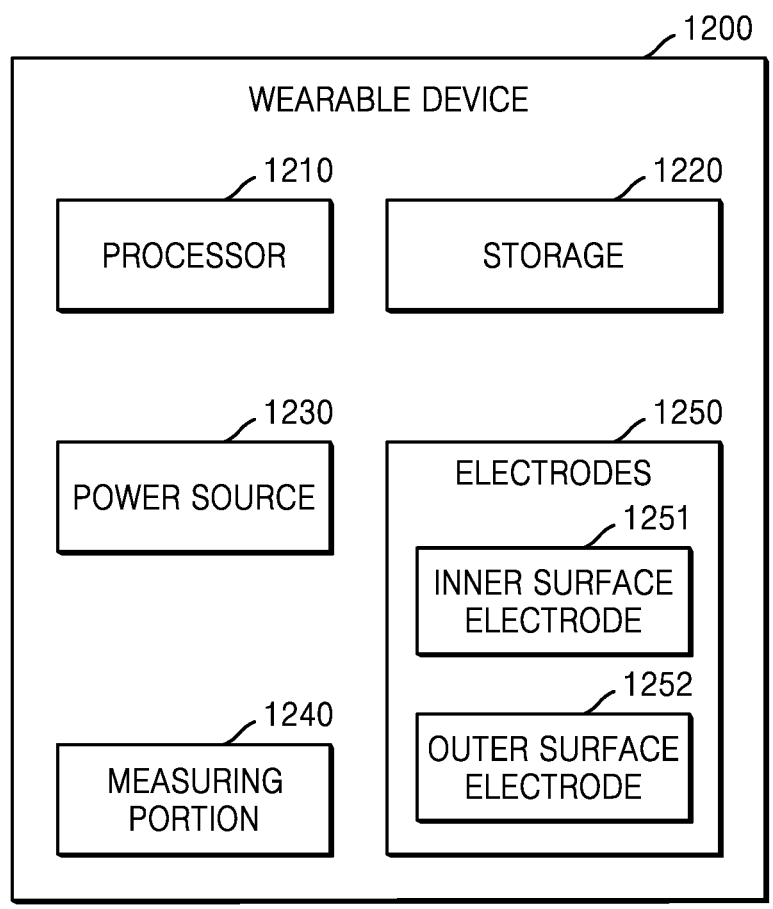
FIG. 12 is a block diagram of a wearable device according to an embodiment of the disclosure.

FIG. 12 is a block diagram of a wearable device 1200 according to an embodiment of the disclosure.

Referring to FIG. 12, according to an embodiment of the disclosure, the wearable device 1200 may include a processor 1210, a storage 1220, a power source 1230, a measuring portion 1240, and electrodes 1250. The electrodes 1250 may include an inner surface electrode 1251 and an outer surface electrode 1252. All components illustrated in FIG. 12 are not essential components of the wearable device 1200. The wearable device 1200 may be implemented with more components than those shown in FIG. 12 or implemented with fewer components than those shown in FIG. 12.

The wearable device 1200 may have a shape that allows wearing of the wearable device on a user's finger. For example, the wearable device 1200 may have a ring, loop, thimble, band, or patch-like shape. In an embodiment, the wearable device 1200 may include a housing that forms the exterior of the wearable device 1200. In an embodiment, the wearable device 1200 having a ring shape may include at least one through insertion hole into which a first finger F1 of the user is inserted.

The power source 1230 may supply necessary power to the wearable device 1200. The power source 1230 may apply a voltage across the plurality of electrodes 1250 or apply a current via at least one electrode 1250 to cause the current to flow through the user's body between the first finger F1 of the user on which the wearable device 1200 is worn and a second finger F2 of the user touching the wearable device 1200. The power source 1230 may include a rechargeable battery that can be charged and discharged.

The storage 1220 may store programs to be executed by the processor 1210, as described below, to control operations of the wearable device 1200. The storage 1220 may store a program including at least one instruction for controlling operations of the electronic device 1200. The storage 1220 may store instructions and program code that are readable by the processor 1210. In an embodiment, the processor 1210 may be implemented to execute instructions or code of a program stored in the storage 1220. The storage 1220 may store data input to or output from the wearable device 1200.

For example, the storage 1220 may include at least one type of storage medium among a flash memory-type memory, a hard disk-type memory, a multimedia card microtype memory, a card-type memory (e.g., an SD card or an XD memory), random access memory (RAM), static RAM (SRAM), read-only memory (ROM), electrically erasable programmable ROM (EEPROM), PROM, a magnetic memory, a magnetic disc, and an optical disc.

Programs stored in the storage 1220 may be categorized into a plurality of modules according to their functions.

The processor 1210 may control all operations of the wearable device 1200. The processor 1210 may perform operations according to an embodiment of the disclosure. For example, the processor 1210 may execute programs stored in the storage 1220 to control all operations of the storage 1220, the power source 1230, the measuring portion 1240, and the electrodes 1250.

The processor 1210 may be composed of hardware components for performing arithmetic, logic and input/output (I/O) operations and signal processing. For example, the processor 1210 may consist of at least one of a CPU, a microprocessor, a graphics processing unit (GPU), application specific integrated circuits (ASICs), digital signal processors (DSPs), digital signal processing devices (DSPDs), programmable logic devices (PLDs), and field programmable gate arrays (FPGAs), but is not limited thereto.

In an embodiment, the processor 1210 may execute one or more instructions stored in the storage 1220 to sense a contact by a second finger F2 of the user via the outer surface electrode 1252, measure, in response to the sensing of the contact, an impedance between the outer surface electrode 1252 and the inner surface electrode 1251 in contact with the first finger F1 of the user, identify a type of the second finger F2 based on the measured impedance, obtain a touch input from the contact by the second finger F2 of the user, identify a pattern of the touch input, identify an operation corresponding to the identified pattern of the touch input and the identified type of the second finger F2, and obtain a control signal for the identified operation. For example, the pattern of the touch input may be determined based on a touch location of the touch input, a touch duration of the touch input, the number of touches in the touch input, and whether the touch input includes a dragging operation.

In an embodiment, the processor 1210 may execute the one or more instructions stored in the storage 1220 to control the power source 1230 to cause a current to flow through a user's body between the first finger F1 and the second finger F2.

In an embodiment, the processor 1210 may control the power source 1230 to apply a voltage between the inner surface electrode 1251 and the outer surface electrode 1252 or emit a current via the inner surface electrode 1251 or the outer surface electrode 1252. For example, the processor 1210 may control switches within the power source 1230 and respectively connected between the power source 1230 and the plurality of electrodes 1250. In this case, the processor 1210 may control a switch connected to a specific electrode 1250 to be closed, thereby electrically connecting the power source 1230 to the corresponding electrode 1250. For example, to apply a voltage across the inner surface electrode 1251 and the outer surface electrode 1252, the processor 1210 may control a switch connected between one end of the power source 1230 and the inner surface electrode 1251 to be closed and a switch connected between the other end of the power source 1230 and the outer surface electrode 1252 to be closed.

In an embodiment, the processor 1210 may execute the one or more instructions stored in the storage 1220 to apply a voltage of a preset magnitude between the inner surface electrode 1251 and the outer surface electrode 1252. The processor 1210 may then control the measuring portion 1240 to measure a current flowing through the user's body via the inner surface electrode 1251 or the outer surface electrode 1252. For example, the measuring portion 1240 may include an ammeter. Then, the processor 1210 may calculate an impedance Z between the inner surface electrode 1251 and the outer surface electrode 1252, based on intensity I of the measured current and the preset magnitude V of the applied voltage.

In an embodiment, the processor 1210 may also execute the one or more instructions stored in the storage 1220 to control the power source 1230 to emit a current via the inner surface electrode 1251 or the outer surface electrode 1252. For example, the processor 1210 may control the power source 1230 by opening or closing switches respectively connected between the power source 1230 and the plurality of electrodes 1250. When a switch connected to a specific electrode 1250 is closed, the power source 1230 may be electrically connected to the corresponding electrode 1250, and the current emitted from the power source 1230 may be output to a part of the user's body contacting the electrode 1250. The processor 1210 may then measure a voltage difference V between the inner surface electrode 1251 and the outer surface electrode 1252, and calculate the impedance Z between the outer surface electrode 1252 and the inner surface electrode 1251, based on the measured voltage difference V and the intensity I of the emitted current.

In an embodiment, the type (or location) of the second finger F2 may include a first type TYPE1 and a second type TYPE2. The second finger F2 that is of the first type TYPE1 may belong to the same hand as the first finger F1, and the second finger F2 that is of the second type TYPE2 may belong to a different hand than the first finger F1. In an embodiment, the processor 1210 may execute the one or more instructions stored in the storage 1220 to compare a magnitude of the measured impedance with a preset threshold and identify a type of the second finger F2 based on a result of the comparing. For example, if the magnitude of the measured impedance is less than the preset threshold, the processor 1210 may identify the type of the second finger F2 as the first type TYPE1, and if the magnitude of the measured impedance is greater than or equal to the preset threshold, the processor 1210 may identify the type of the second finger F2 as the second type TYPE2.

The electrodes 1250 may include the inner surface electrode 1251 and the outer surface electrode 1252. The electrodes 1250 may be included on the housing of the wearable device 1200. The inner surface electrode 1251 may be located on an internal surface of the wearable device 1200 having a ring shape and contact the first finger F1 of the user inserted into the through insertion hole. The outer surface electrode 1252 may be located on an external surface of the wearable device 1200 having a ring shape. The outer surface electrode 1252 may include a plurality of outer surface electrode units. The plurality of outer surface electrode units may be arranged at preset intervals along the external surface of the wearable device 1200.

In an embodiment, the outer surface electrode 1252 may include a fingerprint recognition sensor. In this case, the processor 1210 may execute the one or more instructions stored in the storage 1220 to recognize, in response to the sensing of the contact by the second finger F2 of the user, a fingerprint for the second finger F2 via the fingerprint recognition sensor included in the outer surface electrode 1252, identify a type of the second finger F2 based on the recognized fingerprint, and verify the type of the second finger F2 identified based on the impedance by comparing the type of the second finger F2 identified based on the fingerprint with the type of the second finger F2 identified based on the impedance.

In an embodiment, the wearable device 1200 may further include a communication unit that performs wireless short-range communication with another electronic device. In this case, the processor 1210 may execute the one or more instructions stored in the storage 1220 to generate a control signal for controlling an operation of the other electronic device based on the identified type of the second finger F2 and the touch input, and control the communication unit to transmit the generated control signal to the other electronic device.

Figure 13:
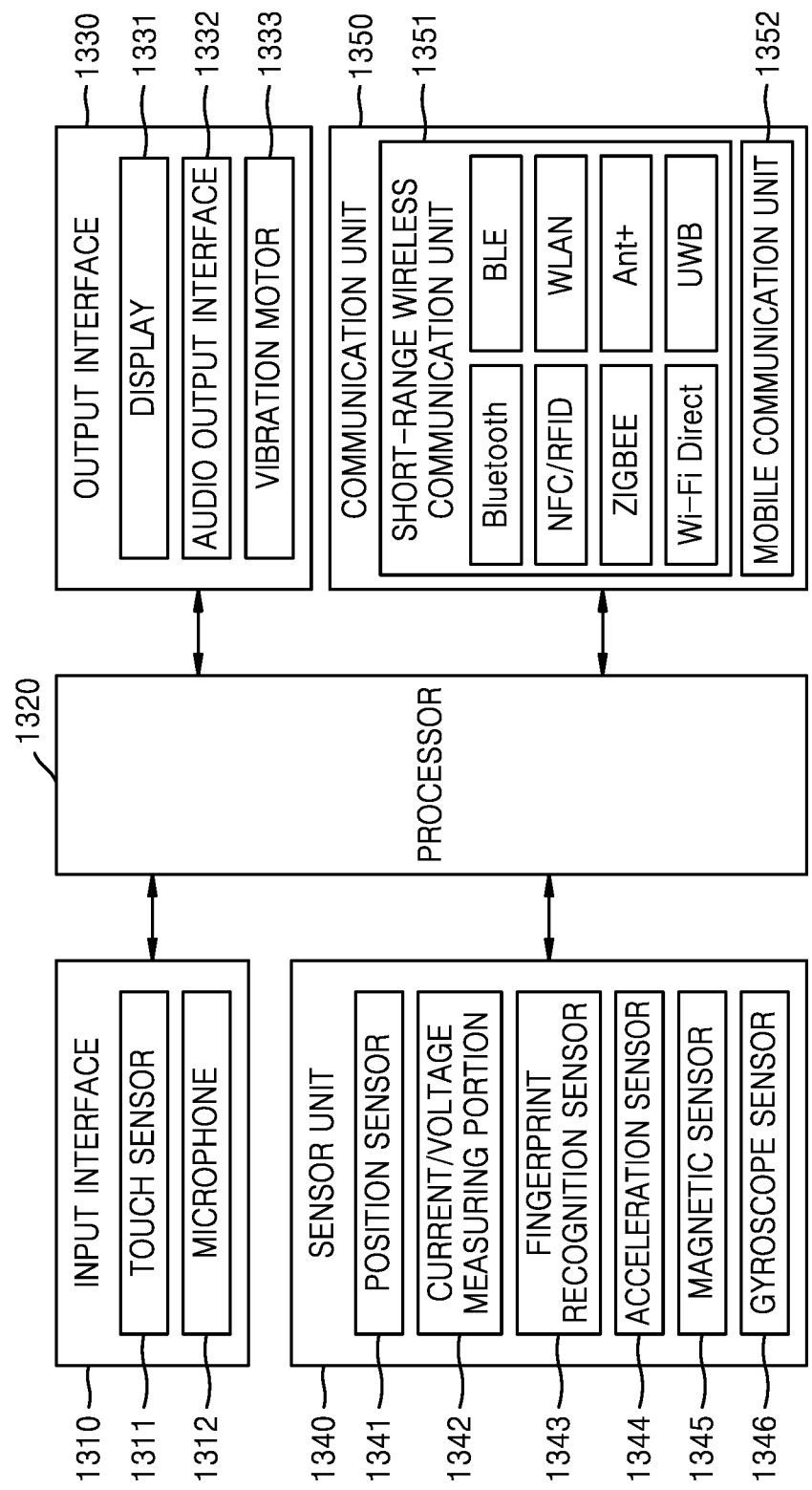
FIG. 13 is a block diagram of a wearable device according to an embodiment of the disclosure.

FIG. 13 is a block diagram illustrating the wearable device (1200 of FIG. 12) according to another embodiment of the disclosure.

Referring to FIG. 13, the wearable device may include an input interface 1310, a processor 1320, an output interface 1330, a sensor unit 1340, and a communication unit 1350. All components illustrated in FIG. 13 are not essential components of the wearable device. The wearable device may be implemented with more components than those shown in FIG. 13 or implemented with fewer components than those shown in FIG. 13.

The input interface 1310 may refer to a device through which the user inputs a signal for controlling the wearable device. For example, the input interface 1310 may include a touch sensor 1311, a microphone 1312, etc. For example, the touch sensor 1311 may include a touch pad (a capacitive overlay type, a resistive overlay type, an infrared beam type, a surface acoustic wave type, an integral strain gauge type, a piezoelectric type, etc.), but is not limited thereto The touch sensor 1311 may receive a user input for touching an external surface of the wearable device. In an embodiment, the touch sensor 1311 may be included in the electrodes 1250 of FIG. 12. The wearable device may sense a contact by the second finger F2 of the user via the touch sensor 1311, or obtain a touch input from the user.

The microphone 1312 may receive an external audio signal and process the audio signal as electrical audio data. For example, the microphone 1312 may receive an audio signal from an external device or a speaker. The microphone 1312 may use various noise removal algorithms to remove noise that occurs in the process of receiving an external audio signal. In an embodiment, the microphone 1312 may receive, from the user, a voice signal for controlling the wearable device. In an embodiment, the wearable device can perform various operations based on a combination of a voice signal input via the microphone 1312 and a touch input received via the touch sensor 1311.

In an embodiment, the processor 1320 may be implemented similarly to the processor 1210 of FIG. 12 described above. The processor 1320 may execute programs stored in a storage to control operations of the components of the wearable device and all operations of the wearable device. For example, the processor 1320 may identify a pattern of a touch input received from the user and a type of a body part contacting the wearable device, and control various operations according to a corresponding control command. For example, the processor 1320 may generate a control signal for controlling an operation of the wearable device itself or controlling another electronic device connected to the wearable device according to the identified control command.

The output interface 1330 may output an audio signal, a video signal, or a vibration signal, and may include a display 1331, an audio output interface 1332, and a vibration motor 1333.

The display 1331 may display and output information processed by the wearable device. For example, the display 1331 may display icons or the like to receive a touch input from the user.

Moreover, the display 1331 and the touch sensor 1311 form a layer structure to construct a touch screen. In this case, the display 1331 may be used as an input device as well as an output device. The display 1331 may include at least one of a liquid crystal display (LCD), a thin-film-transistor LCD (TFT LCD), an organic light-emitting diode (OLED) display, a flexible display, a three-dimensional (3D) display, and an electrophoretic display.

The audio output interface 1332 may output audio data received via the communication unit 1350 or stored in the storage. The vibration motor 1333 may output a haptic effect, such as a vibration signal, to the user. In an embodiment, the audio output interface 1332 or the vibration motor 1333 may generate a notification signal for notifying the user of an event generated in the wearable device itself or an event generated in another electronic device connected to the wearable device.

The sensor unit 1340 may sense a status of the wearable device or the surroundings of the wearable device, and transmit information about the sensed status to the processor 1320. The sensor unit 1340 may include, but is not limited to, at least one of a position sensor (e.g., a global positioning system (GPS)) 1341, a current/voltage measuring portion 1342, a fingerprint recognition sensor 1343, an acceleration sensor 1344, a magnetic sensor 1345, and a gyroscope sensor 1346.

For example, the current/voltage measuring portion 1342 may include the measuring portion 1240 of FIG. 12. In a method of controlling the wearable device worn on a finger, according to an embodiment of the disclosure, the current/voltage measuring portion 1342 may measure a current or voltage for measuring an impedance between an inner surface electrode in contact with a first finger of the user and an outer surface electrode in contact with a second finger of the user.

In an embodiment, the fingerprint recognition sensor 1343 may be included in the outer surface electrode 1252 of FIG. 12. The fingerprint recognition sensor 1343 may include, for example, at least one of an optical fingerprint recognition sensor, a capacitive fingerprint recognition sensor, or an ultrasonic fingerprint recognition sensor. According to an embodiment of the disclosure, in the method of controlling the wearable device worn on a finger, the fingerprint recognition sensor 1343 may recognize a fingerprint for the second finger of the user touching the outer surface electrode. The recognized fingerprint may be used in an operation of verifying a type of the second finger identified based on an impedance. In an embodiment, the recognized fingerprint may be used when user authentication is required in various applications of the wearable device.

In addition, functions of various sensors included in the sensor unit 1340 may be intuitively inferred by a person skilled in the art from their names, so detailed descriptions thereof will be omitted.

The communication unit 1350 may include one or more components for communicating another electronic device. For example, the communication unit 1350 may include a short-range wireless communication unit 1351 and a mobile communication unit 1352.

The wearable device may be connected to another electronic device via the short-range wireless communication unit 1351. The short-range wireless communication unit 1351 may include, but is not limited to, a Bluetooth communication unit, a Bluetooth Low Energy (BLE) communication unit, a near field communication (NFC) unit, a wireless local area network (WLAN) (or Wi-Fi) communication unit, a ZigBee communication unit, an Infrared Data Association (IrDA) communication unit, a Wi-Fi Direct (WFD) communication unit, an ultra-wideband (UWB) communication unit, and an Ant+ communication unit. In an embodiment, the wearable device may exchange control signals with the other electronic device via the short-range communication unit 1351.

The wearable device may transmit or receive a wireless signal to or from at least one of a base station, an external terminal, and a server on a mobile communication network via the mobile communication unit 1352. In this case, the wireless signal may include a voice call connection signal or various types of signals according to transmission and reception of text/multimedia messages.

In an embodiment, when the wearable device functions only as a controller for the other electronic device connected thereto, the communication unit 1350 of the wearable device does not directly include the mobile communication unit 1352, but may include only the short-range communication unit 1351. In this case, the wearable device may generate a control signal for controlling an operation of the other electronic device connected thereto based on a touch input from the user, and transmit the generated control signal to the other electronic device via the short-range communication unit 1351. In addition, when a notification through the wearable device is required, the wearable device may receive information about the notification from the other electronic device via the short-range communication unit 1351.

In an embodiment, in addition to functioning as a controller for another electronic device connected thereto, the wearable device itself may function as an independent mobile communication terminal. In this case, the communication unit 1350 of the wearable device may include both the short-range communication unit 1351 and the mobile communication unit 1352, and the wearable device may operate as an independent mobile communication terminal via the mobile communication unit 1352 even when not connected to another electronic device.

Various embodiments of the disclosure may be implemented or supported by one or more computer programs which may be created from computer-readable program code and recorded on computer-readable media. In the disclosure, an "application" and a "program" refer to one or more computer programs, software components, a set of instructions, procedures, functions, objects, classes, instances, associated data, or parts thereof, which are suitable for implementation in computer-readable program code. The "computer-readable program code" may include various types of computer code including source code, object code, and executable code. The "computer-readable media" may include various types of media that are accessible by a computer, such as ROM, RAM, a hard disk drive (HDD), compact discs (CDs), digital video discs (DVDs), or various other types of memory.

Furthermore, a computer-readable storage medium may be provided in the form of a non-transitory storage medium. In this regard, the 'non-transitory storage medium' is a tangible device, and may exclude wired, wireless, optical, or other communication links through which transient electrical or other signals are transmitted. Moreover, the 'non-transitory storage medium' does not differentiate between where data is semi-permanently stored in the storage medium and where the data is temporarily stored in the storage medium. For example, the 'non-transitory storage medium' may include a buffer in which data is temporarily stored. The computer-readable media may be any available media that are accessible by the computer and may include both volatile and non-volatile media and both detachable and non-detachable media. The computer-readable media may include media in which data may be permanently stored and media in which data may be stored and then overwritten, such as a rewritable optical disk or an erasable memory device.

According to an embodiment, methods according to various embodiments set forth herein may be included in a computer program product when provided. The computer program product may be traded, as a product, between a seller and a buyer. For example, the computer program product may be distributed in the form of a computer-readable storage medium (e.g., CD-ROM) or distributed (e.g., downloaded or uploaded) on-line via an application store (e.g., Google Play Store™) or directly between two user devices (e.g., smartphones). For online distribution, at least a part of the computer program product (e.g., a downloadable app) may be at least transiently stored or temporally created on a computer-readable storage medium, such as a server of a manufacturer, a server of an application store, or a memory of a relay server.

The above description of the disclosure is provided for illustration, and one of ordinary skill in the art will understand that it can be readily modified into other specific forms without changing the technical ideas or essential features of the disclosure. Accordingly, the above-described embodiments and all aspects thereof are merely examples and are not limiting. For example, each component defined as an integrated component may be implemented in a distributed fashion, and likewise, components defined as separate components may be implemented in an integrated form.

While certain embodiments the disclosure have been particularly shown and described, it will be understood that various changes in form and details may be made therein without departing from the spirit and scope of the following claims.

What is claimed is:

1. A method of controlling a wearable device worn on a finger of a user, the method comprising:

sensing a contact by a second finger of the user via an outer surface electrode located on an outer circumferential surface of the wearable device worn on a first finger of the user;

based on the sensing of the contact, measuring an impedance between the outer surface electrode and an inner surface electrode that is in contact with the first finger of the user;

identifying a type of the second finger based on the impedance; and controlling an operation of the wearable device based on the type of the second finger.

2. The method of claim 1, wherein the measuring of the impedance between the outer surface electrode and the inner surface electrode comprises:
applying a voltage between the inner surface electrode and the outer surface electrode to cause an applied current to flow through a body of the user between the first finger and the second finger;
measuring a measured current flowing through the inner surface electrode or the outer surface electrode; and
obtaining the impedance between the outer surface electrode and the inner surface electrode, based on an intensity of the measured current and a magnitude of the voltage.

3. The method of claim 1, wherein the type of the second finger comprises a first type and a second type,
the second finger that is of the first type belongs to a same hand as the first finger, and the second finger that is of the second type belongs to a different hand than the first finger, and
wherein the identifying of the type of the second finger comprises:
comparing a magnitude of the impedance with a preset threshold;
identifying the type of the second finger as the first type based on the magnitude of the impedance being less than the preset threshold; and
identifying the type of the second finger as the second type based on the magnitude of the impedance being greater than or equal to the preset threshold.

4. The method of claim 1, wherein the outer surface electrode comprises a plurality of outer surface electrode units, and
wherein the plurality of outer surface electrode units are arranged at preset intervals along the outer circumferential surface of the wearable device.

5. The method of claim 1, further comprising
obtaining a touch input from the contact by the second finger of the user,
wherein the controlling of the operation of the wearable device based on the type of the second finger comprises:
identifying a pattern of the touch input;
identifying a corresponding operation of the wearable device corresponding to the pattern of the touch input and the type of the second finger; and
controlling the wearable device based on the corresponding operation.

6. The method of claim 5, wherein the pattern of the touch input is determined based on a touch duration of the touch input, a number of touches in the touch input, and whether the touch input comprises a dragging operation.

7. The method of claim 1, wherein the outer surface electrode comprises a fingerprint recognition sensor, and the method further comprises:
recognizing, in response to the sensing of the contact by the second finger of the user, a fingerprint for the second finger via the fingerprint recognition sensor;
identifying the type of the second finger based on the fingerprint; and
verifying the type of the second finger identified based on the impedance by comparing the type of the second finger identified based on the fingerprint with the type of the second finger identified based on the impedance.

8. The method of claim 1, wherein the controlling of the operation of the wearable device based on the type of the second finger comprises:
generating a control signal for controlling an operation of another electronic device connected to the wearable device via wireless short-range communication based on the type of the second finger; and
controlling the operation of the wearable device to transmit the control signal to the other electronic device.

9. A wearable device for obtaining a control signal, the wearable device comprising:
a body portion comprising at least one through insertion hole;
an inner surface electrode located on an internal surface of the body portion, the inner surface electrode being configured to contact a first finger of a user;
an outer surface electrode located on an external surface of the body portion, the outer surface electrode being configured to contact a second finger of the user;
a power source;
a storage storing a program comprising at least one instruction; and
at least one processor configured to execute the at least one instruction stored in the storage to:
sense a contact by the second finger via the outer surface electrode,
based on sensing the contact, measure an impedance between the outer surface electrode and the inner surface electrode,
identify a type of the second finger based on the impedance,
obtain a touch input from the contact by the second finger,
identify a pattern of the touch input,
identify a corresponding operation corresponding to the pattern of the touch input and the type of the second finger, and
obtain a control signal for the corresponding operation.

10. The wearable device of claim 9, wherein the at least one processor is further configured to execute the at least one instruction to
control the power source to apply a voltage between the inner surface electrode and the outer surface electrode to cause an applied current to flow through a body of the user between the first finger and the second finger,
measure a measured current flowing through the inner surface electrode or the outer surface electrode, and
obtain the impedance between the outer surface electrode and the inner surface electrode, based on an intensity of the measured current and a magnitude of the voltage.

11. The wearable device of claim 9, wherein the type of the second finger comprises a first type and a second type,
wherein the second finger that is of the first type belongs to a same hand as the first finger, and the second finger that is of the second type belongs to a different hand than the first finger, and
wherein the at least one processor is further configured to execute the at least one instruction to:
compare a magnitude of the impedance with a preset threshold,
identify the type of the second finger as the first type based on the magnitude of the impedance being less than the preset threshold, and
identify the type of the second finger as the second type based on the magnitude of the impedance being greater than or equal to the preset threshold.

12. The wearable device of claim 9, wherein the outer surface electrode comprises a plurality of outer surface electrode units, and
wherein the plurality of outer surface electrode units are arranged at preset intervals along the external surface of the wearable device.

13. The wearable device of claim 9, wherein the pattern of the touch input is determined based on a touch duration of the touch input, a number of touches in the touch input, and whether the touch input comprises a dragging operation.

14. The wearable device of claim 9, wherein the outer surface electrode comprises a fingerprint recognition sensor, and
wherein the at least one processor is further configured to execute the at least one instruction to
recognize, in response to the sensing of the contact by the second finger of the user, a fingerprint for the second finger via the fingerprint recognition sensor,
identify the type of the second finger based on the fingerprint, and
verify the type of the second finger identified based on the impedance by comparing the type of the second finger identified based on the fingerprint with the type of the second finger identified based on the impedance.

15. The wearable device of claim 9, further comprising:
a communication unit configured to perform wireless short-range communication with another electronic device,
wherein the at least one processor is further configured to execute the at least one instruction to:
generate the control signal for controlling an operation of the other electronic device connected via the wireless short-range communication, based on the type of the second finger and the touch input, and
control the communication unit to transmit the control signal to the other electronic device.

16. A wearable device comprising:
an inner surface electrode located on an internal surface of the wearable device, the inner surface electrode being configured to contact a first finger on a first hand of a user;
an outer surface electrode located on an external surface of the wearable device;
at least one memory storing a program comprising at least one instruction; and
at least one processor configured to execute the at least one instruction stored in the at least one memory to:
based on a contact between a second finger of the user and the outer surface electrode, measure an impedance between the outer surface electrode and the inner surface electrode,
based on the impedance, determine a location of the second finger on the first hand or a second hand of the user,
based on the location of the second finger being on the first hand, execute a first operation, and
based on the location of the second finger being on the second hand, execute a second operation different from the first operation.

17. The wearable device of claim 16, further comprising:
a power source,
wherein the at least one processor is further configured to execute the at least one instruction to:
control the power source to apply a voltage between the inner surface electrode and the outer surface electrode to cause an applied current to flow through a body of the user between the first finger and the second finger,
measure a measured current flowing through the inner surface electrode or the outer surface electrode, and
obtain the impedance between the outer surface electrode and the inner surface electrode, based on an intensity of the measured current and a magnitude of the voltage.

18. The wearable device of claim 16, wherein the at least one processor is further configured to execute the at least one instruction to:
compare a magnitude of the impedance with a preset threshold,
determine that the location of the second finger is on the first hand based on the magnitude of the impedance being less than the preset threshold, and
determine that the location of the second finger is on the second hand based on the magnitude of the impedance being greater than or equal to the preset threshold.

19. The wearable device of claim 16, wherein the outer surface electrode comprises a fingerprint recognition sensor, and
wherein the at least one processor is further configured to execute the at least one instruction to:
recognize a fingerprint for the second finger via the fingerprint recognition sensor,
determine the location of the second finger based on the fingerprint, and
verify whether the location of the second finger based on the impedance by comparing the location of the second finger identified based on the fingerprint with the location of the second finger identified based on the impedance.

20. The wearable device of claim 16, further comprising:
a communication unit configured to perform wireless short-range communication with another electronic device,
wherein the at least one processor is further configured to execute the at least one instruction to:
obtain a touch input from the contact by the second finger,
identify an operation of the other electronic device corresponding to the touch input and the location of the second finger,
generate a control signal for controlling the operation of the other electronic device, and
control the communication unit to transmit the control signal to the other electronic device.

* * * * *